United States Patent
Zahemszky et al.

(10) Patent No.: US 11,665,606 B2
(45) Date of Patent: May 30, 2023

(54) METHODS AND NETWORK NODES FOR HANDLING A SESSION COMPRISING DATA PACKETS TO BE TRANSMITTED TO A WIRELESS DEVICE

(71) Applicant: Telefonaktiebolaget LM Ericsson (publ), Stockholm (SE)

(72) Inventors: András Zahemszky, Sollentuna (SE); Zhang Fu, Stockholm (SE); Patrick Sellstedt, Sollentuna (SE); Göran Rune, Linköping (SE); Dinand Roeland, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 17/427,378

(22) PCT Filed: Jan. 31, 2019

(86) PCT No.: PCT/SE2019/050085
§ 371 (c)(1),
(2) Date: Jul. 30, 2021

(87) PCT Pub. No.: WO2020/159413
PCT Pub. Date: Aug. 6, 2020

(65) Prior Publication Data
US 2022/0132385 A1 Apr. 28, 2022

(51) Int. Cl.
*H04W 36/12* (2009.01)
*H04W 36/02* (2009.01)
(52) U.S. Cl.
CPC ........... *H04W 36/12* (2013.01); *H04W 36/02* (2013.01)
(58) Field of Classification Search
None
See application file for complete search history.

(56) References Cited

U.S. PATENT DOCUMENTS 10,419,982 B1 * 9/2019 Gundavelli ............. H04L 45/34
2012/0294276 A1 * 11/2012 Jaiswal ............... H04W 36/023
370/331
(Continued)

FOREIGN PATENT DOCUMENTS

WO 2018030982 A1 2/2018

OTHER PUBLICATIONS

ZTE Corporation, 3GPP TSG RAN WG3#ad-hoc1807, R3-183666, "Further discussion on End Marker,"Agenda item 10.5.6.1, Montreal, Canada, Jul. 2-6, 2018, pp. 1-8. (Year: 2018).*
(Continued)

*Primary Examiner* — Benjamin Lamont
(74) *Attorney, Agent, or Firm* — Murphy, Bilak & Homiller, PLLC

(57) ABSTRACT

Disclosed is a method performed by a network node (130, 140, 160) of a wireless communication network (100) comprising a first (130) and a second (140) core network node and a first (150) and a second (160) base station (150). A session of a wireless device (170) comprises data packets routed via a plurality of anchor network nodes (115, 120) from a data network (110). In connection with the wireless device (170) handing over from the first base station (150) and the first core network node (130) to the second base station (160) and the second core network node (140), the method comprises receiving information of the number of the plurality of anchor network nodes (115, 120) via which data packets of the session are routed, receiving data packets from the plurality of anchor network nodes (115, 120), receiving an end marker of each of the plurality of anchor network nodes (115, 120), each end marker indicating a last data packet of one of the plurality of anchor network nodes routed via the first core network node (130), and when the number of received end markers equals the number of the (Continued)

plurality of anchor network nodes, triggering to send to the wireless device (170) any data packets related to the session not routed via the first base station stored in a buffer of the second base station.

9 Claims, 12 Drawing Sheets

(56) References Cited

U.S. PATENT DOCUMENTS

| | | | |
|---|---|---|---|
| 2019/0174377 A1* | 6/2019 | Decarreau | H04W 36/32 |
| 2019/0313295 A1* | 10/2019 | Xu | H04W 36/023 |
| 2020/0236604 A1* | 7/2020 | Li | H04W 36/0016 |

OTHER PUBLICATIONS

3GPP, "3GPP TS 23.501 V15.4.0", 3rd Generation Partnership Project; Technical Specification Group Services and System Aspects; System Architecture for the 5G System; Stage 2 (Release 15), Dec. 2018, 1-236.

3GPP, "3GPP TS 23.502 V15.4.0", 3rd Generation Partnership Project; Technical Specification Group Services and System Aspects; Procedures for the 5G System; Stage 2 (Release 15), Dec. 2018, 1-346.

Nokia, et al., "Support of End Markers in 5GS: case of Dual Connectivity and of EPC IWK", SA WG2 Meeting #127, S2-183419 (revision of S2-183419), Sanya, P.R. China, Apr. 16-20, 2018, 1-4.

Patni, Sakshi, et al., "Dynamic Gateway Selection for Load Balancing in LTE Networks", LNCS 8314, Springer-Verlag Berlin Heidelberg, 2014, 408-422.

* cited by examiner

METHODS AND NETWORK NODES FOR HANDLING A SESSION COMPRISING DATA PACKETS TO BE TRANSMITTED TO A WIRELESS DEVICE

TECHNICAL FIELD

The present disclosure relates generally to methods and network nodes of a wireless communication network for handling a session comprising data packets to be transmitted to a wireless device. The present disclosure further relates to computer programs and carriers corresponding to the above methods and nodes.

BACKGROUND

A wireless communication network comprises a radio access network (RAN) and a core network. The RAN is the part of the wireless communication network that handles wireless connections of wireless communication devices, aka wireless devices, to the wireless communication network via a plurality of radio access network nodes, aka base stations. The core network is the part of the wireless communication network that connects the RAN to data networks, e.g. the Internet or enterprise networks. The core network is e.g. responsible for forwarding packets between the wireless devices and the data networks, for charging, legal intercept, Quality of Service (QoS) management, and for policy control etc.

FIG. 1 describes a wireless communication network comprising a RAN 20 and a 5$^{th}$ Generation (5G) core network 30, 40 as defined by the 3$^{rd}$ Generation Partnership Program (3GPP). FIG. 1 also shows a wireless device 25, here called User Equipment (UE), wirelessly connected to the RAN 20. The core network consists of a user plane component 30, called User Plane Function (UPF) and control plane components 40. The UPF 30 is further connected to a data network (DN) 50. According to 5G standard specifications, at least one UPF 30 is passed by a data packet traversing between the RAN 20 and the DN 50. A communication interface N3 is an interface between the RAN 20 and the core network, i.e. the UPF 30 on the user plane, while communication interfaces N1 between the UE 25 and the control plane components 40 and N2 between the RAN 25 and the control plane components 40 are used to transfer control plane signaling between UE/RAN and control plane functions. An N9 interface is a reference point between different UPFs 30, while the N6 interface is an interface between the UPF 30 and the DN 50.

The architecture of the control plane functions 40 follows service-based principles. The idea is that the functions in the architecture can deliver certain services to the other functions. They are also smaller functions than traditional functions in previous generations. The Service-Based Architecture (SBA) is based on a cloud-native principle, where the functions are expected to run in a cloud-native environment using service-based interfaces, prepared for stateless functionality and scaling. Currently, 3GPP has defined the following control plane functions 40: Access and Mobility Management Function (AMF), Authentication Server Function (AUSF), Session Management Function (SMF), Network Exposure Function (NEF), Network Repository Function (NRF), Network Slice Selection Function (NSSF), Policy Control Function (PCF), Unified Data Management (UDM), Application Function (AF). For the responsibilities of each of the above functions, please see 3GPP TS 23.501, Version 15.4.0, Chapter 6.

In order to achieve a more optimal routing of packets in the 5G core network, i.e. between the DN 50 and the RAN 20, two components have been added to the core network shown in FIG. 1; one into the user plane and one into the control plane.

The new component in the user plane is called Internet Protocol (IP) Announcement Point (IAP). For the communication network outside the core network, such as the DN, the IAP is a router, and it advertises IP address/prefix ranges; i.e. it tells via a regular routing information protocol, which addresses/prefixes it can route packets to. When receiving downlink IP packets, i.e. packets coming from the DN 50, the IAP encapsulates the received packet and the encapsulated packet is sent to the UE's 25 current location in the core network, i.e. to the UPF that is serving the UE. The current location is retrieved by contacting a Location Register (LR), which is the new component in the control plane. More specifically, the IAP sends an "LR query" including the UE's IP address (or prefix) and in turn, the "LR reply" from the LR contains the UE's current location. In the variant discussed in 3GPP, the UE's location will be the IP address of the UPF, where the N3 communication interface for the UE 25 is currently terminated. Multiple IAPs may be needed in the communication network. This may be because the operator's network is large and there are multiple peering points to the DN, or because of an edge scenario where the DN is split up in multiple local (edge) portions of the DN and a global portion of the DN. The IAPs do not need to contact the LR after receiving every single packet, it will clearly not scale. Therefore, the IAP has a local cache and it will store the UE-location mappings.

As mentioned above, the IAPs advertise UE IP address ranges/prefixes. Different IAPs may advertise disjoint and overlapping ranges. In an important case, each IAP will advertise the whole IP address range; i.e. potentially every IAP can route packets towards all UEs in the communication network. Consequently, multiple IAPs may advertise the IP address of a single UE and thus multiple IAPs may be sending packets in the downlink towards the UE in the same session. I.e. there may be multiple "paths" towards the UPF. This is however invisible to the base station (in 5G called gNodeB) of the RAN serving the UE, since there is a single tunnel between the UPF and the base station.

When a UE travels through a wireless communication network, it performs handover, i.e. it changes its wireless network connection from a first base station to a second base station. For some handovers, the UE does not only change base station but the network also relocates the UPF serving the UE, i.e. at such handover the UE's network connection is changed from a first base station and a first UPF to a second base station and a second UPF. Then during handover, some packets sent downlink from the DN towards the UE will be sent on an "old path", i.e. via the old UPF (source UPF) and the old base station (source gNodeB) to the new base station (target gNodeB), while some packets will be sent on a "new path", i.e. via the new UPF (target UPF) and directly to the target gNodeB. In order to assist reordering of packets received at the target gNodeB before and after such a handover, end markers are used. An end marker is a special packet sent on the user plane. The end marker is the last user plane packet sent on the old path, before changing to the new path. By using the end marker, the target gNodeB can ensure that it first sends to the UE all packets coming via the old path, and as soon as the end-marker is received it can start sending to the UE, packets (out of which some may already have been received) via the new path.

As described in standard specification 3GPP TS 23.501, version 15.4.0 Section 5.8.2.9, in 5G Core, either the SMF or the UPF performs constructing of end marker packets, which one is decided by network configuration. As described in 23.501 and in 3GPP TS 23.502, version 15.4.0, e.g. Section 4.9.1.2, the following procedures involve end markers: Xn based inter-Next Generation (NG)-RAN handover without UPF relocation, Xn based inter NG-RAN handover with insertion of intermediate UPF, Xn based inter NG-RAN handover with re-allocation of intermediate UPF, Inter NG-RAN node N2 based handover.

FIG. 2 shows the procedure of Xn based inter NG-RAN handover as described in 3GPP TS 23.502 Section 4.9.1.2.2. Involved are the following nodes: a UE 61 involved in a session; a RAN source 62, which is the gNB to which the UE is connected before handover, a RAN target 63, which is the gNB to which the UE is connected after handover, an AMF 64, an SMF 65, a UPF 66 and a peer 67, wherein a "peer" is an application in the DN, or more precisely the host running the application. As described in Section 4.9.1.2, the UPF 66 referred in FIG. 2 is the UPF that terminates the N3 interface in the 5GC. Steps 1, 2 and 3 shows how user plane data is transmitted before a handover of the UE 61 is performed. I.e. in the uplink (step 2), data is sent from the UE 61, via the RAN source 62 and via the UPF 66 to the peer 67. In the downlink (step 3), data is sent from the peer 67 via the UPF 66 to the UE 61 via the RAN source 62. Then at steps 4-6 handover in the RAN of the UE 61 from the RAN source 62 to the RAN target 63 is prepared and executed. Thereafter, the uplink data is sent (step 8) via the RAN target 63 to the UPF. However, downlink data is sent (step 9) from the UPF 66 via the RAN source 62 and the RAN target 63 before the RAN target sends the downlink data to the UE 61. In order to finalize the handover (step 10) in the core network, the RAN target 63, in response to the handover execution (step 6) in the RAN, sends a path switch request (step 11) to the AMF 64. The AMF updates, via the SMF the UPF 66 with the ID of the RAN target, i.e. the new gNB ID (steps 12-13). During the handover finalization, downlink data packets are sent (step 17) the old path, i.e. as in step 9, i.e. via the RAN source 62 to RAN target 63. However, when the UPF 66 is informed of the handover, it can start sending data (step 18) the new path directly to the RAN target 63. As the first data packets that are then sent (step 18) on the new path may arrive at the RAN target before the last data packets arrive via the old path (step 17), the first data packets are buffered (step 19) at the RAN target 63. Immediately after the UPF 66 has sent the last data packet the old path, the UPF sends (step 21) one or more end markers on the old path to the RAN source 62 and further from the RAN source 62 to the RAN target 63 (step 22). When the RAN target 63 receives the one or more end markers it knows the last data packet has been received the old path and it flushes its buffer (step 28), in other words, sends to the UE 61, the buffered data packets that came the new path before the end marker was received. Thereafter, all downlink data packets are sent (step 29) on the new path. Simultaneously, the control signaling of the handover finalization continues after the Session Mode response (step 14) is received at the SMF 65, by acknowledgements to steps 11 and 12, in steps 23-24. A Release Resource message (step 25) sent by the RAN target to the RAN source in response to step 24, is a final indication to the RAN source that it can remove all context it has for the UE, i.e. buffers can be released, IDs like keying material can be removed, etc.

It is possible to achieve the more optimal routing architecture described above including the IAP and LR functionalities with today's 3GPP 5G core network. The 3GPP specifications allow a single PDU session, and a single IP address belonging to that session, to be anchored by multiple UPFs. This is shown in FIG. 3. UPF-a 72 acts as merging point for downlink packets. UPF-b 73, UPF-c 74 and UPF-d 75 interface with a data network 76 and act as anchor points in the core network, towards the data network. In other words, a downlink data packet sent from an application in the data network towards a UE may be sent via either UPF-b, UPF-c or UPF-d and further to the UPF-a and further to the gNB where the UE is connected before the data packet is delivered to the UE. If the UE's user plane packet treatment (the user plane service) is done in UPF-a, whereas UPF-b, UPF-c, UPF-d merely act as anchor points, then UPF-b, UPF-c and UPF-d can be seen as IAPs. In this configuration, the LR would be implemented in the SMF 77 and some proprietary LR-IAP signaling may need to be added to the SMF-UPF interfaces.

The diagram of FIG. 4 shows the signaling with the set-up of FIG. 3, where UPF-a of FIG. 3 is named "UPF", and any of UPF-b, UPF-c or UPF-d of FIG. 3 is named IAP 68 as they have an anchoring function. End marker handling here is the same is in FIG. 2.

The current specification 3GPP TS 23.502 4.9.1.3.3, step 10a says: "The SMF indicates to only one of the PDU Session Anchors to send the "end marker" packet. To ensure the "end marker" is the last user plane packet on the old path, the SMF should modify the path on other PDU Session Anchors before it indicates the PDU Session Anchor to send the "end marker" packet."

As only one end marker packet is sent, even in case more than one PDU session anchor, i.e. IAPs, is involved in the session, the SMF 77 should either 1) control the IAPs to change their path one by one, in series, where only the last IAP sends the end marker, or 2) the SMF knows the latency from IAP to the access, where the SMF only instructs the IAP with the longest latency to send the end marker. A disadvantage of the first approach is that it makes the handover procedure unnecessary long, especially in an optimal routing case where we may see multiple IAPs that hold state for a UE. A disadvantage of the second approach is that the SMF needs to have knowledge of the topology. Consequently, there is a need of an improved handling of data packets in a session involving a plurality of PDU session anchor nodes, aka anchor network nodes, especially during handover.

SUMMARY

It is an object of the invention to address at least some of the problems and issues outlined above. It is possible to achieve these objects and others by using methods, network nodes and wireless communication devices as defined in the attached independent claims.

According to one aspect, a method is provided, performed by a network node of a wireless communication network, for handling a session comprising data packets to be transmitted to a wireless device. The wireless communication network comprises a first core network node, a second core network node, a first base station and a second base station. The session comprises data packets routed via a plurality of anchor network nodes from a data network, and, in connection with the wireless device handing over from the first base station and the first core network node to the second base station and the second core network node, the method comprises receiving information of the number of the plurality of anchor network nodes via which data packets of the session are routed, and receiving data packets from the plurality of anchor network nodes. The method further comprises receiving an end marker of each of the plurality of anchor network nodes, each end marker indicating a last data packet of one of the plurality of anchor network nodes routed via the first core network node and, when the number of received end markers equals the number of the plurality of anchor network nodes, triggering to send to the wireless device any data packets related to the session not routed via the first base station stored in a buffer of the second base station.

According to another aspect, a method is provided, performed by an anchor network node of a wireless communication network, for handling a session comprising data packets to be transmitted to a wireless device. The wireless communication network comprises a first core network node, a second core network node, a first base station, a second base station, and at least one additional anchor network node. The session comprises data packets routed via the anchor network node and the at least one additional anchor network node from a data network towards the wireless device. Further, in connection with the wireless device handing over from the first base station and the first core network node to the second base station and the second core network node, the method comprises sending, to the first core network node, data packets of the session received from the data network, and receiving, from a control network node, information of the number of anchor network nodes involved in the session. The method further comprises sending, to the first core network node, the information of the number of anchor network nodes involved in the session, and sending, to the first core network node, an end marker indicating a last packet to be routed via the first core network node. Further, after the anchor network node has sent the end marker, it sends data packets of the session received from the data network to the second core network node.

According to another aspect, provided is a method performed by a first core network node of a wireless communication network, for handling a session comprising data packets to be transmitted to a wireless device. The wireless communication network further comprises a second core network node, a first base station and a second base station. The session comprises data packets routed via a first and a second anchor network node from a data network. Further, in connection with the wireless device handing over from the first base station and the first core network node to the second base station and the second core network node, the method comprises receiving data packets from the first and the second anchor network node, and sending the data packets received from the first and the second anchor network nodes to the first base station. The method further comprises sending a RAN end marker to the second base station via the first base station in response to information that a relocation of the wireless device from the first core network node to the second core network node has been requested, and sending, to the second core network node, the data packets received from the first and the second anchor network nodes after the sending of the RAN end marker. Further, the method comprises receiving a first end marker from the first anchor network node, the first end marker indicating a last packet of the first anchor network node routed via the first core network node, and sending the first end marker to the second core network node. The method further comprises receiving a second end marker from the second anchor network node, the second end marker indicating a last packet of the second anchor network node routed via the first core network node, and sending the second end marker to the second core network node.

According to another aspect, provided is a method performed by a second core network node of a wireless communication network, for handling a session comprising data packets to be transmitted to a wireless device. The wireless communication network further comprises a first core network node, a first base station and a second base station. The session comprises data packets routed via a first and a second anchor network node from a data network. Further, in connection with the wireless device handing over from the first base station and the first core network node to the second base station and the second core network node, the method comprises receiving data packets from the first and the second anchor network node routed via the first core network node, and receiving data packets from the first and the second anchor network node routed without passing the first core network node. The method further comprises storing the data packets received from the first anchor network node without passing the first core network node in a first buffer, when such data packets are received before a first end marker is received from the first core network node, the first end marker indicating a last packet of the first anchor network node routed via the first core network node, receiving the first end marker, and sending the data packets stored in the first buffer to the second base station in response to the received first end marker. The method further comprises storing the data packets received from the second anchor network node without passing the first core network node in a second buffer, when such data packets are received before a second end marker is received from the first core network node, the second end marker indicating a last packet of the second anchor network node routed via the first core network node, receiving the second end marker, and sending the data packets stored in the second buffer to the second base station in response to the received second end marker.

According to another aspect, provided is a network node operable in a wireless communication system configured for handling a session comprising data packets to be transmitted to a wireless device. The wireless communication network comprises a first core network node, a second core network node, a first base station and a second base station. The session comprises data packets routed via a plurality of anchor network nodes from a data network. Further, in connection with the wireless device handing over from the first base station and the first core network node to the second base station and the second core network node, and the network node comprising a processing circuitry and a memory, said memory containing instructions executable by said processing circuitry, the network node is operative for receiving information of the number of the plurality of anchor network nodes via which data packets of the session are routed, and receiving data packets from the plurality of anchor network nodes. The network node is further operative for receiving an end marker of each of the plurality of anchor network nodes, each end marker indicating a last data packet of one of the plurality of anchor network nodes routed via the first core network node and, when the number of received end markers equals the number of the plurality of anchor network nodes, triggering to send to the wireless device any data packets related to the session not routed via the first base station stored in a buffer of the second base station.

According to another aspect is provided an anchor network node operable in a wireless communication system, configured for handling a session comprising data packets to be transmitted to a wireless device. The wireless communication network comprises a first core network node, a second core network node, a first base station and a second base station, and at least one additional anchor network node. The session comprises data packets routed via the anchor network node and the at least one additional anchor network node from a data network towards the wireless device. Further, in connection with the wireless device handing over from the first base station and the first core network node to the second base station and the second core network node, the anchor network node comprising a processing circuitry and a memory, said memory containing instructions executable by said processing circuitry, the anchor network node is operative for sending, to the first core network node, data packets of the session received from the data network. The anchor network node is further operative for receiving, from a control network node, information of the number of anchor network nodes involved in the session and sending, to the first core network node, the information of the number of anchor network nodes involved in the session. The anchor network node is further operative for sending, to the first core network node, an end marker indicating a last packet to be routed via the first core network node, and sending to the second core network node, after the end marker has been sent, data packets of the session received from the data network.

According to another aspect is provided a first core network node operable in a wireless communication system, configured for handling a session comprising data packets to be transmitted to a wireless device. The wireless communication network further comprises a second core network node, a first base station and a second base station. The session comprises data packets routed via a first and a second anchor network node from a data network. Further, in connection with the wireless device handing over from the first base station and the first core network node to the second base station and the second core network node, the first core network node comprising a processing circuitry and a memory, said memory containing instructions executable by said processing circuitry, the first core network node is operative for receiving data packets from the first and the second anchor network node and sending the data packets received from the first and the second anchor network nodes to the first base station. The first core network node is further operative for sending a RAN end marker to the second base station via the first base station in response to information that a relocation of the wireless device from the first core network node to the second core network node has been requested, and sending, to the second core network node, the data packets received from the first and the second anchor network nodes after the sending of the RAN end marker. The first core network node is further operative for receiving a first end marker from the first anchor network node, the first end marker indicating a last packet of the first anchor network node routed via the first core network node, and sending the first end marker to the second core network node. The first core network node is further operative for receiving a second end marker from the second anchor network node, the second end marker indicating a last packet of the second anchor network node routed via the first core network node, and sending the second end marker to the second core network node.

According to another aspect is provided a second core network node operable in a wireless communication network and configured for handling a session comprising data packets to be transmitted to a wireless device. The wireless communication network further comprises a first core network node, a first base station and a second base station. The session comprises data packets routed via a first and a second anchor network node from a data network. Further, in connection with the wireless device handing over from the first base station and the first core network node to the second base station and the second core network node, the second core network node comprising a processing circuitry and a memory, said memory containing instructions executable by said processing circuitry, whereby the second core network node is operative for receiving data packets from the first and the second anchor network node, routed via the first core network node, and receiving data packets from the first and the second anchor network node, routed without passing the first core network node. The second core network node is further operative for storing the data packets received from the first anchor network node without passing the first core network node in a first buffer, when such data packets are received before a first end marker is received from the first core network node, the first end marker indicating a last packet of the first anchor network node routed via the first core network node, receiving the first end marker, and sending the data packets stored in the first buffer to the second base station in response to the received first end marker. The second core network node is further operative for storing the data packets received from the second anchor network node without passing the first core network node in a second buffer, when such data packets are received before a second end marker is received from the first core network node, the second end marker indicating a last packet of the second anchor network node routed via the first core network node, receiving the second end marker, and sending the data packets stored in the second buffer to the second base station in response to the received second end marker.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution provided to at least some of the problems mentioned is built on letting every anchor network node, e.g. IAP that handles downlink data packets of the session of the UE doing handover, to send an end marker. So, multiple end markers are sent instead of just one. The advantage of this is that lossless handover with in-order delivery is achieved.

Figure 5:
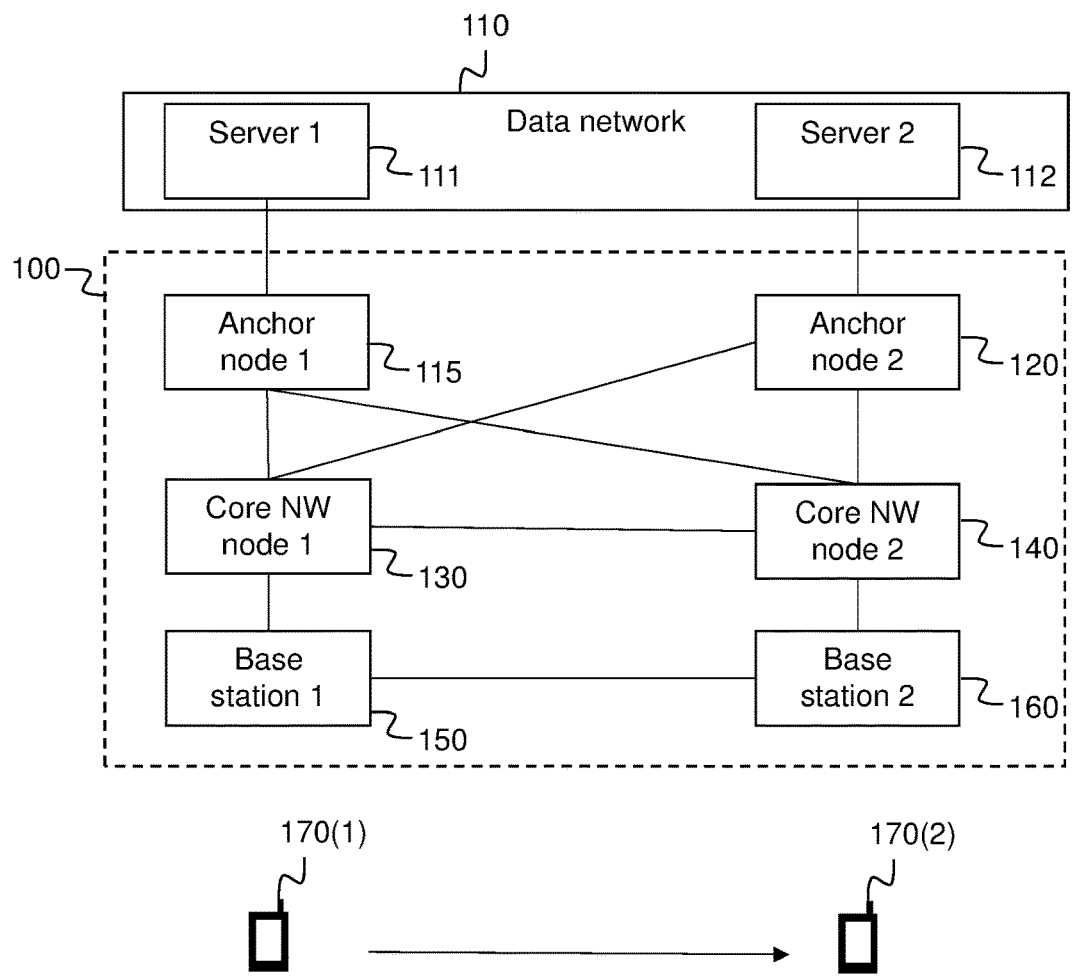
FIG. 5 is a block diagram of a wireless communication network in which the present invention may be used.

FIG. 5 shows a wireless communication network 100 in which the present invention may be used. The wireless communication network 100 comprises a first anchor network node 115 and a second anchor network node 120. The anchor network nodes 115, 120 function as interfaces towards one or more data networks 110, such as the Internet. Different servers of the one or more data networks may be connected different anchor network nodes. This is symbolized in FIG. 5 by a first server 111 being connected to the first anchor network node 115 and a second server 112 being connected to the second anchor network nodes 120. The wireless communication network 100 further comprises a first core network node 130, a second core network node 140, a first base station 150 and a second base station 160.

In FIG. 5 there is also shown a wireless device 170 that performs handover from the first base station 150 and the first core network node 130 to the second base station 160 and the second core network node 140. The actual handover is illustrated with an arrow, and reference 170(1) is the wireless device before handover and reference 170(2) is the wireless device after handover.

The wireless communication network 100 may be any kind of wireless communication network that can provide wireless communication ability to wireless devices. Example of such wireless communication networks are Global System for Mobile communication (GSM), Enhanced Data Rates for GSM Evolution (EDGE), Universal Mobile Telecommunications System (UMTS), Code Division Multiple Access 2000 (CDMA 2000), Long Term Evolution (LTE), LTE Advanced, Wireless Local Area Networks (WLAN), Worldwide Interoperability for Microwave Access (WiMAX), WiMAX Advanced, as well as 5G wireless communication networks based on technology such as New Radio (NR).

The first and second base stations (BS) 150, 160 may be any kind of radio access network node that provides wireless access to the wireless device 170 alone or in combination with another network node. Other examples of such a radio access network node is a base transceiver station, a BS controller, a network controller, a Node B (NB), an evolved Node B (eNB), a NR BS, a Multi-cell/multicast Coordination Entity, a relay node, an access point (AP), a radio AP, a remote radio unit (RRU), a remote radio head (RRH) and a multi-standard BS (MSR BS).

The wireless device 170, aka wireless communication device, may be any type of device capable of wirelessly communicating with a base station 150, 160 using radio signals. For example, the wireless communication device 170 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 4:
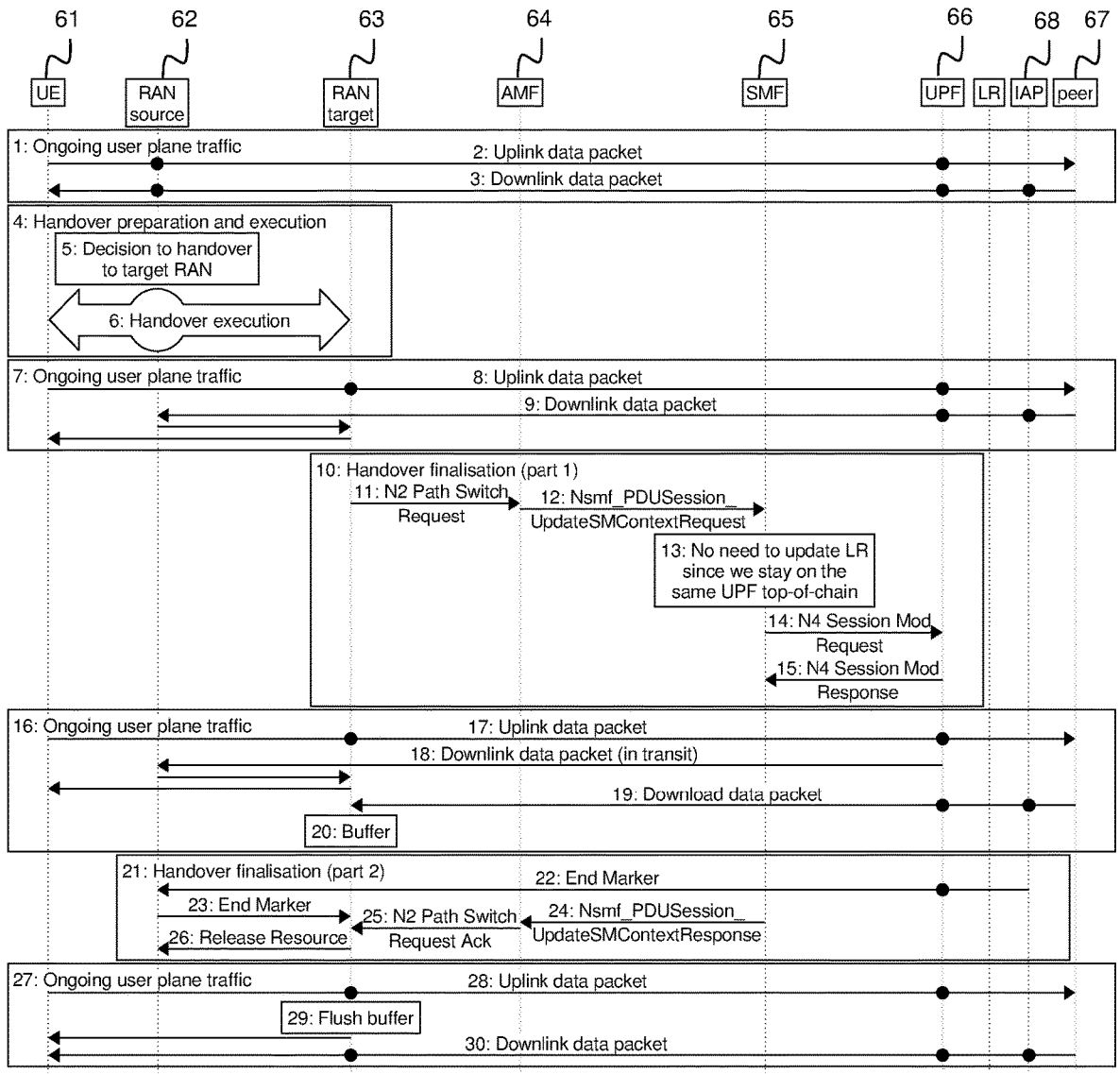
FIG. 4 is a signaling diagram of an inter NG-RAN handover for the improved core network architecture of FIG. 3.

For an ongoing session of the wireless device 170, some downlink packets are sent from the data network 110 via the first anchor network node 115 and some packets are sent from the data network via the second anchor network node 120. The first server 111 sends its data packets via the first anchor network node 115 and the second server 112 sends its data packets via the second anchor network node 120, regardless of the position of the UE. Before handover, i.e. when the wireless device 170 is in 170(1) position, the packets are sent from the first and second anchor network nodes 115, 120 to the first core network node 130 and to the first base station 150 and further to the wireless device 170. During handover, the first core network node 130 still sends packets originating from the different IAPs to the first base station 150 and the first base station sends the packets further to the second base station 160, this is the same as in step 9 of FIG. 4. At some time during the handover, the first and second anchor network nodes 115, 120 start sending packets directly to the second core network node 140 and further to the second base station 160. Those packets may arrive earlier to the second base station 160 than the last packets sent via the first core network node 140, and are therefore buffered in the second base station 160, and the second base station 160 awaits an end marker showing that this was the last packet over the first core network node 130 before it sends the buffered packets. Today, end markers are sent from only one anchor/core network node per session. However, if there are multiple anchor network nodes involved per session, it is not clear when the last packet is sent. A solution provided in this disclosure is to let every anchor network node involved in transporting packets for the wireless device session send end markers.

Figure 6:
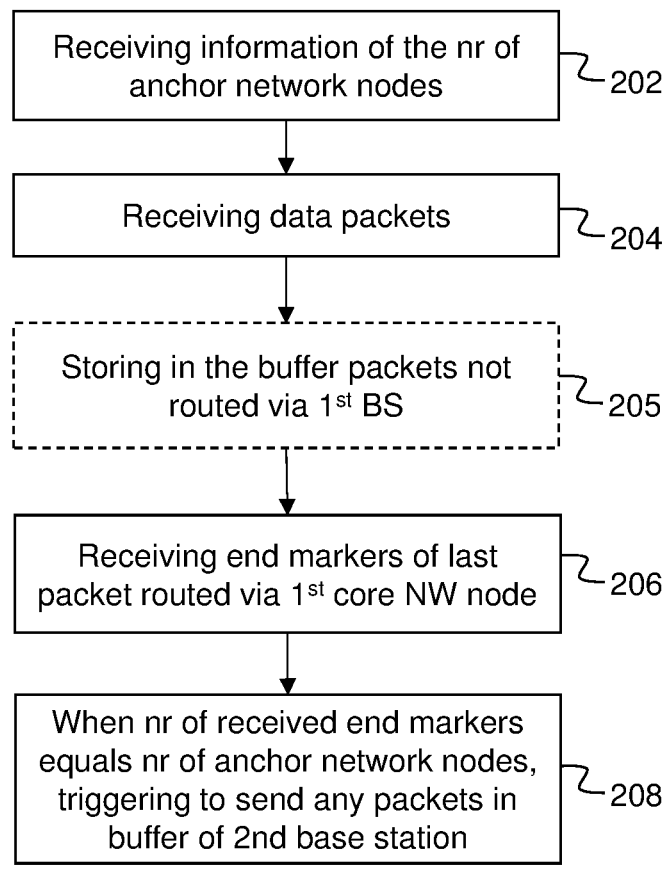
FIG. 6 is a flow chart illustrating a method performed by a network node, according to possible embodiments.

FIG. 6, in conjunction with FIG. 5, describes a method performed by a network node 130, 140, 160 of a wireless communication network 100, for handling a session comprising data packets to be transmitted to a wireless device 170. The wireless communication network 100 comprises a first core network node 130, a second core network node 140, a first base station 150 and a second base station 160. The session comprises data packets routed via a plurality of anchor network nodes 115, 120 from a data network 110, and, in connection with the wireless device 170 handing over from the first base station 150 and the first core network node 130 to the second base station 160 and the second core network node 140, the method comprises receiving 202 information of the number of the plurality of anchor network nodes 115, 120 via which data packets of the session are routed and receiving 204 data packets from the plurality of anchor network nodes 115, 120. The method further comprises receiving 206 an end marker of each of the plurality of anchor network nodes 115, 120, each end marker indicating a last data packet of one of the plurality of anchor network nodes routed via the first core network node 130 and, when the number of received end markers equals the number of the plurality of anchor network nodes, triggering 208 to send to the wireless device 170 any data packets related to the session not routed via the first base station stored in a buffer of the second base station.

The network node performing the method may be the first core network node 130, the second core network node 140 or the second base station 160. The different alternatives are describes below in more detail. That the session comprises data packets routed via a plurality of anchor network nodes from a data network signifies that some of the data packets of the session are routed via one of the plurality of anchor network nodes and other of the data packets are routed via another of the plurality of anchor network nodes. The number of the plurality of anchor network nodes signifies the anchor network nodes involved in the session, i.e. the anchor network nodes that delivers data packets to the UE within the ongoing session. The end markers are received from the anchor network nodes and are routed via the first core network node. The respective anchor network node may append its respective end marker(s) to the last packet being routed via the first core network node. The packets related to the session stored in a buffer of the second base station are packets that are not routed via the first base station and that are therefore received at the second core network node and the second base station before the number of received end markers equals the number of anchor network nodes, in other words, packets that are received before the last packet routed via the first base station is received.

Hereby, as the network node receives end markers from all anchor network nodes involved in the session and compares the number of received end markers to the number of involved anchor network nodes, the network node would know when the last packet has arrived from all involved anchor network nodes. Thereby, it would be clear when all data has been received via the old path and the buffered data at the second base station can be emptied at the correct time so that the data packets are sent from the second base station towards the UE at a correct order.

According to an embodiment, the information of the number of the plurality of anchor network nodes is received 202 from a control plane network node. The control plane network node may be the SMF or LR in case of 5G, or a Mobility Management Entity (MME) in case of 4G/EPC. When the control plane network node informs the network node, i.e. first or second core network node, or second base station, the end marker packets sent from the IAPs do not need to be extended with numbering information, and can consequently take less information space.

According to another embodiment, the information of the number of the plurality of anchor network nodes is received 202 together with each end marker. For example, the information received together with each end marker may be "I am an end marker out of a total of 5 end markers to receive for this session". Hereby, a round of control plane signaling is saved, compared to the above embodiment.

According to an embodiment, the network node is the second base station 160. Further, the method comprises storing 205 in the buffer, any packets of the received 204 packets that are not routed via the first base station and that are received 204 from the anchor network nodes before the sending is triggered 208. Further, the triggering 208 to send comprises sending to the wireless device 170 the packets that are stored in the buffer.

In other words, in this embodiment the method is performed in the second base station. Further, during the handover process the data packets are received from the anchor network nodes, routed via the old path, i.e. via the first core network node and the first base station, and also routed via the new path, i.e. via the second core network node. Any data packets that are received routed via the new path before the last packet is received via the old path is stored in the buffer. When the number of received end markers equals the number of the plurality of anchor network nodes it is an indication that the last packet has been received via the old path, and when this last packet has been sent to the wireless device, the second base station sends the stored packets to the wireless device.

According to another embodiment, the network node is the first core network node 130. Further, the method comprises sending the received 204 data packets to the second base station via the first base station. Further, the triggering 208 to send comprises sending a triggering end marker to the second base station 160 via the first base station 150, the triggering end marker triggering the second base station to send any packets related to the session it has stored in its buffer.

In other words, in this embodiment the method is performed by the first core network node 130. The first core network node receives 204 the data packets from the anchor network nodes via the old path and sends the data packets further to the second base station via the first base station. When the first core network node has received 206 an end marker of each of the plurality of anchor network nodes 115, 120 so that the number of received end markers equals the number of anchor network nodes involved in the session, the first core network node sends a triggering end marker to the second base station 160 via the first base station 150. The triggering end marker is a sign that the last packet has been sent to the second base station via the old path and the reception at the second base station of the triggering end marker triggers the second base station to send any packets of the session that it has received via the new path and stored in its buffer before the triggering end marker was received.

According to another embodiment, the network node is the second core network node 140. The method further comprises sending the received 204 data packets to the second base station. Further, the triggering 208 to send comprises sending a triggering end marker to the second base station via the first base station, the triggering end marker triggering the second base station to send any packets related to the session it has stored in its buffer.

Figure 10:
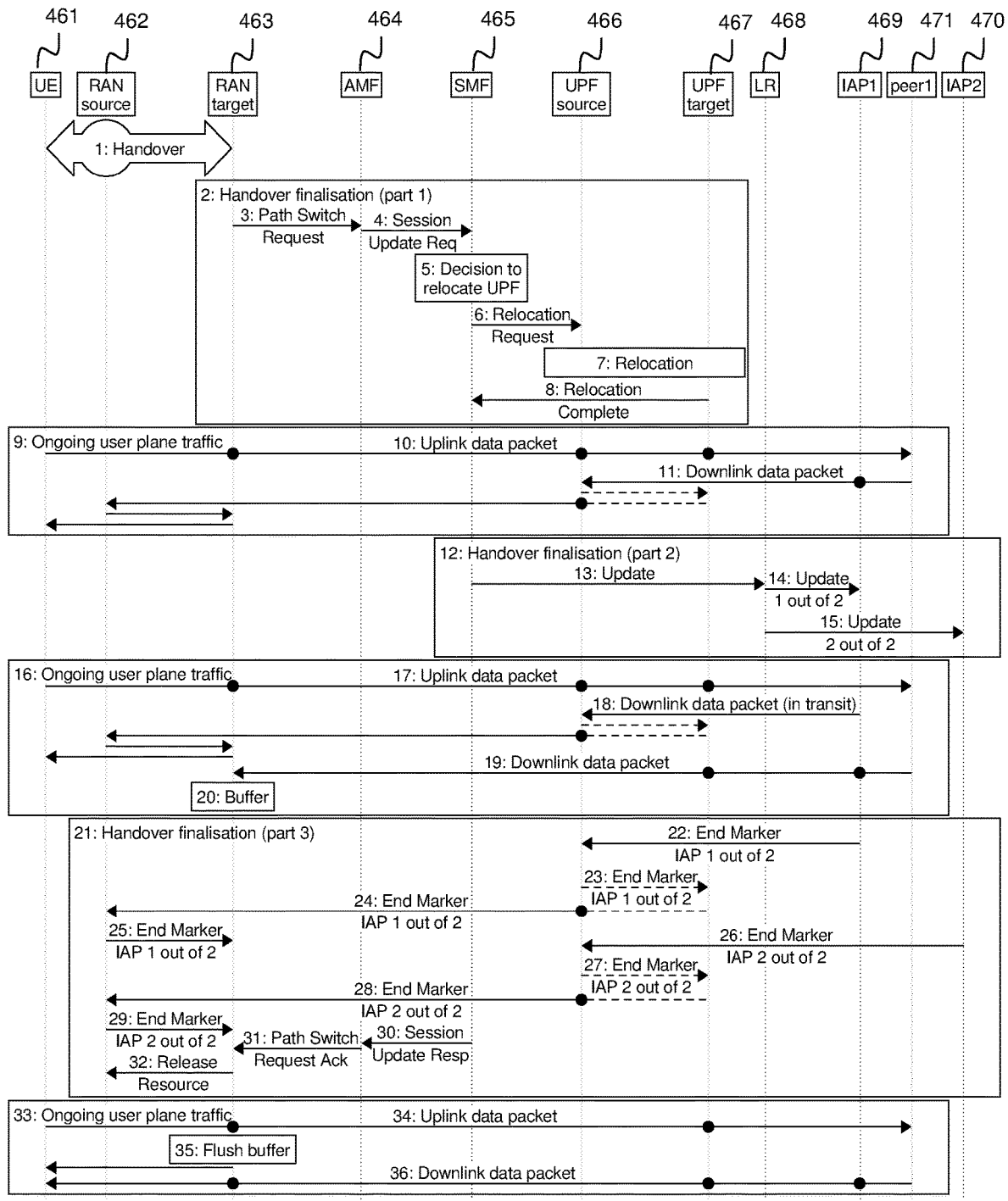
FIGS. 10-12 are signaling diagrams illustrating different embodiments of procedures according to further possible embodiments.

In other words, in this embodiment the method is performed by the second core network node 140. In this embodiment, the second core network node receives 204 the data packets from the anchor network nodes via the old path, i.e. from the first core network node, in case the packets are sent via the dashed arrows of steps 11 and 18 of FIG. 10 and via the new path, i.e. from the second core network node and sends the data packets further to the second base station. The data packets received the old path are sent to the second base station via the first base station, probably back via the first core network node that in its turn sends them to the first base station, whereas the data packets received the new path are sent directly to the second base station. Observe that both the data packets coming the new path and being received before the last packets are received via the old path, and the data packets received the old path are sent further as they are received. It is at the second base station that the data packets coming the new path may be buffered. When the second core network node has received 206 an end marker of each of the plurality of anchor network nodes 115, 120 so that the number of received end markers equals the number of anchor network nodes involved in the session, the second core network node sends a triggering end marker to the second base station 160 the same way as the data packets sent the old path, i.e. via the first base station and probably also via the first core network node. The triggering end marker is a sign that the last packet has been sent to the second base station via the old path and the reception at the second base station of the triggering end marker triggers the second base station to send any packets of the session that it has received via the new path and stored in its buffer before the triggering end marker was received.

Figure 7:
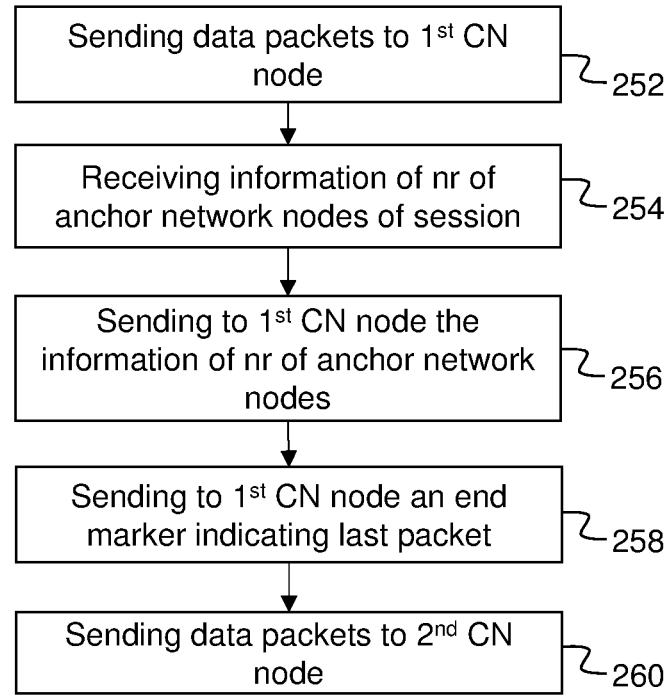
FIG. 7 is a flow chart illustrating a method performed by an anchor network node, according to possible embodiments.

FIG. 7, in conjunction with FIG. 5, describes a method performed by an anchor network node 115 of a wireless communication network 100, for handling a session comprising data packets to be transmitted to a wireless device 170. The wireless communication network 100 comprises a first core network node 130, a second core network node 140, a first base station 150 and a second base station 160, and at least one additional anchor network node 120. The session comprises data packets routed via the anchor network node 115 and the at least one additional anchor network node from a data network 110 towards the wireless device 170. Further, in connection with the wireless device 170 handing over from the first base station 150 and the first core network node 130 to the second base station 160 and the second core network node 140, the method comprises sending 252, to the first core network node 130, data packets of the session received from the data network, and receiving 254, from a control network node, information of the number of anchor network nodes involved in the session. The method further comprises sending 256, to the first core network node 130, the information of the number of anchor network nodes involved in the session, and sending 258, to the first core network node 130, an end marker indicating a last packet to be routed via the first core network node 130. Further, after the anchor network node 115 has sent the end marker, it sends 260 data packets of the session received from the data network to the second core network node 140.

An anchor network node is a node connecting the core network to a data network. That the session comprises data packets routed via the anchor network node and at least one additional anchor network node from a data network signifies that some of the data packets of the session are routed via the anchor network node and other of the data packets are routed via the at least one additional anchor network nodes. The number of anchor network nodes involved in the session is the anchor network node and the at least one additional anchor network node. The information of the number of anchor network nodes involved in the session may be sent together with the end marker. For example, the anchor network node can send an information that "this is an end marker from IAP2 out of a total of 5 IAPs involved in this session". Alternatively, the information of number of anchor network nodes involved in the session maybe sent separately from the actual end markers. For example, "this session involves 5 IAPs".

The first core network node uses the information it receives from the anchor network node of the number of anchor network nodes involved in the session and each received end marker to determine when the last packet of the session is received that is to be routed via the first base station, and then informs the second base station by sending a triggering end marker via the first base station, which triggers the second base station to empty its buffer. Alternatively, the first core network node sends the information of the number of anchor network nodes involved in the session and each received end marker to the second core network node that in its turn informs the second base station. As a third alternative, the first core network node sends the information of the number of anchor network nodes involved in the session and each received end marker to the second base station and the second base station empties its buffer when it sees that the number of received end markers equals the information of the number of anchor network nodes involved in the session. The anchor network node in its turn sends all data packets of the session to the first core network before it has sent the end marker and all data packets of the session to the second core network node after it has sent the end marker.

Figure 8:
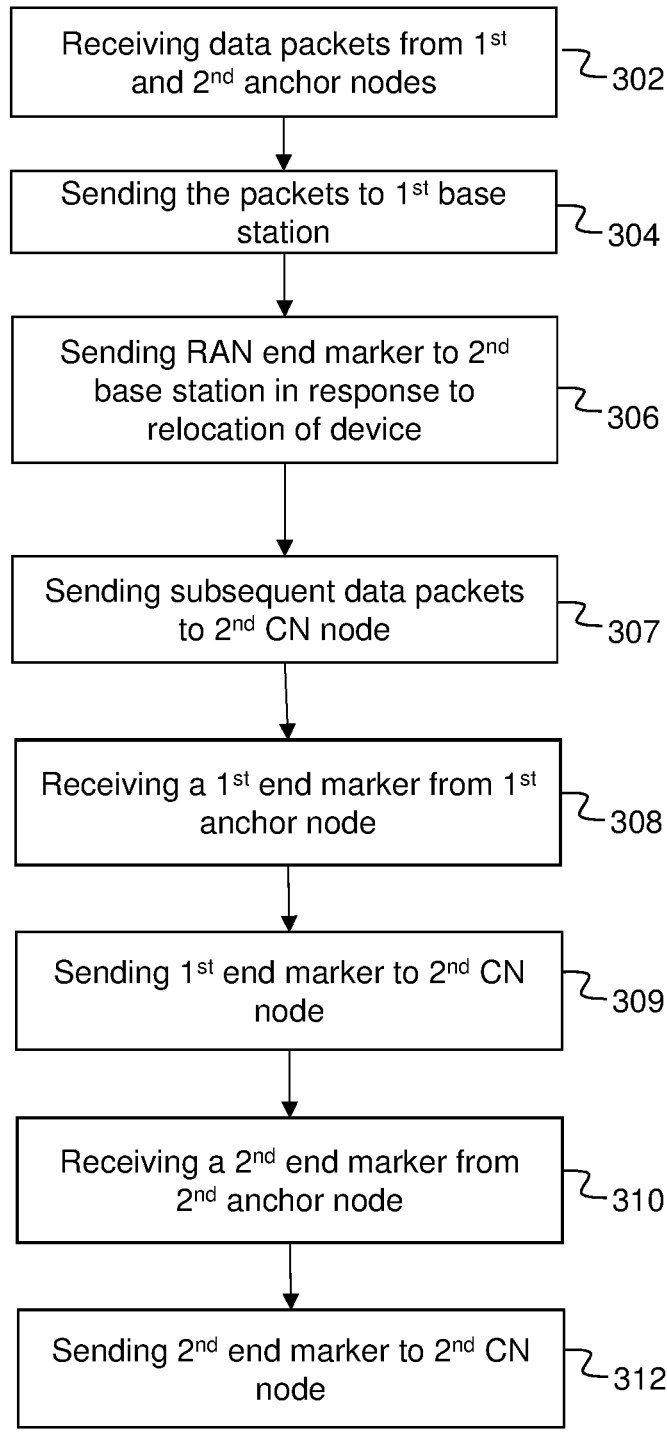
FIG. 8 is a flow chart illustrating a method performed by a first core network node, according to possible embodiments.

FIG. 8, in conjunction with FIG. 5, shows a method performed by a first core network node 130 of a wireless communication network 100, for handling a session comprising data packets to be transmitted to a wireless device 170. The wireless communication network 100 further comprises a second core network node 140, a first base station 150 and a second base station 160. The session comprises data packets routed via a first and a second anchor network node 115, 120 from a data network 110. Further, in connection with the wireless device 170 handing over from the first base station 150 and the first core network node 130 to the second base station 160 and the second core network node 140, the method comprises receiving 302 data packets from the first and the second anchor network node 115, 120, and sending 304 the data packets received from the first and the second anchor network nodes 115, 120 to the first base station. The method further comprises sending 306 a RAN end marker to the second base station 160 via the first base station 150 in response to information that a relocation of the wireless device 170 from the first core network node 130 to the second core network node 140 has been requested, and sending 307, to the second core network node 140, the data packets received from the first and the second anchor network nodes 115, 120 after the sending of the RAN end marker. Further, the method comprises receiving 308 a first end marker from the first anchor network node 115, the first end marker indicating a last packet of the first anchor network node 115 routed via the first core network node 130, and sending 309 the first end marker to the second core network node 140. The method further comprises receiving 310 a second end marker from the second anchor network node 120, the second end marker indicating a last packet of the second anchor network node 120 routed via the first core network node 130, and sending 312 the second end marker to the second core network node 140.

That the session comprises data packets routed via a first and a second anchor network node signifies that some of the data packets of the session are routed via the first anchor network node and other of the data packets are routed via the second anchor network node.

In other words, the first core network node first sends the received downlink data packets to the first base station. After sending the RAN end marker, indicating that the device has relocated to the second base station, the first core network node sends the data packets received after it has sent the RAN end marker, directly to the second core network node and further to the second base station instead of sending them to the first base station. Such a RAN end marker, when received at the second base station from the first base station, could trigger the second base station to send all packets it has stored in its buffer that may have been received not routed via the first base station. In other words, the RAN end marker informs the second base station that no more packets will be received related to the session via the first base station. By the first core network node receiving from each respective anchor network node, an end marker when the last packet is sent via the first core network node, and sending these end markers further to the second core network node, the second core network node would know when the last packet is received via the first core network node. Hereby, there are two end marker types and two buffers, one RAN end marker that the second base station reacts on to cater for correct order of packets received directly from the core network and for packets received via the first base station, and another end marker that the second core network reacts on to cater for correct order of packets routed via the first core network node to the second core network node and packets routed directly to the second core network node without passing the first core network node.

Figure 9:
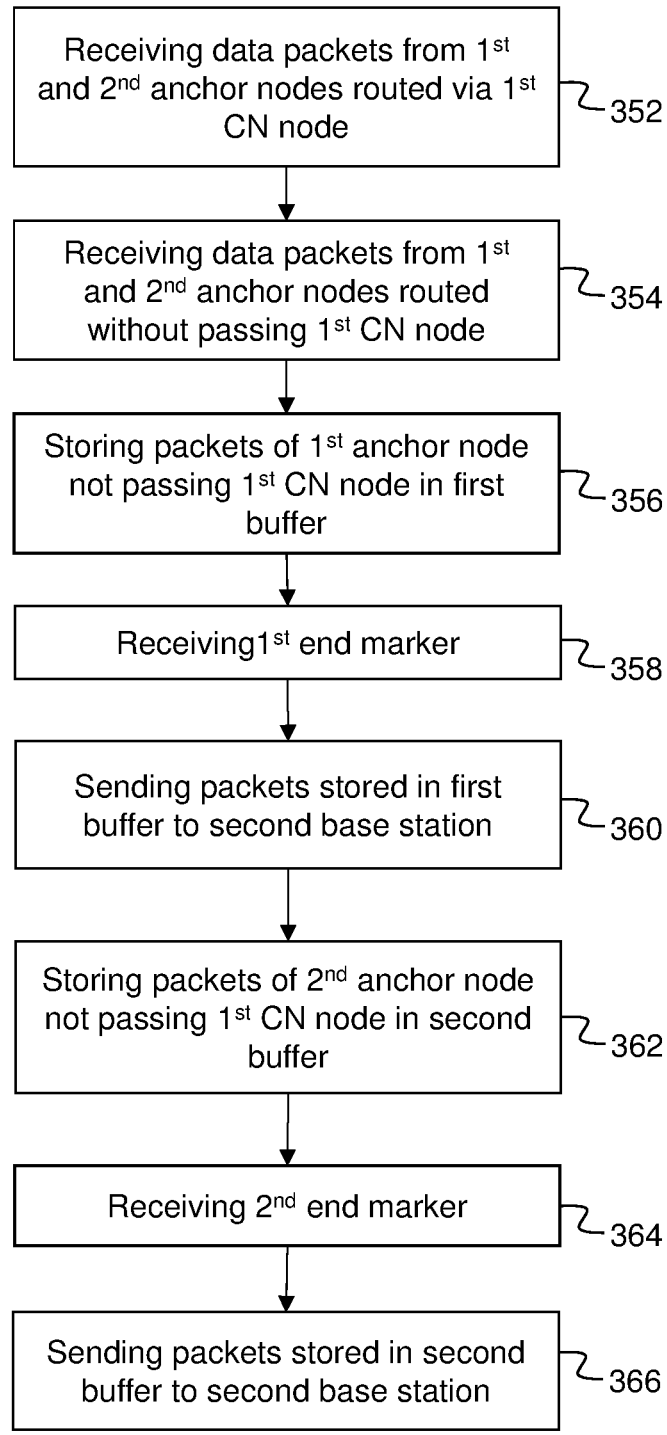
FIG. 9 is a flow chart illustrating a method performed by a second core network node, according to possible embodiments.

FIG. 9, in conjunction with FIG. 5, describes a method performed by a second core network node 140 of a wireless communication network 100, for handling a session comprising data packets to be transmitted to a wireless device 170. The wireless communication network 100 further comprises a first core network node 130, a first base station 150 and a second base station 160. The session comprises data packets routed via a first and a second anchor network node 115, 120 from a data network 110. Further, in connection with the wireless device 170 handing over from the first base station 150 and the first core network node 130 to the second base station 160 and the second core network node 140, the method comprises receiving 352 data packets from the first and the second anchor network node 115, 120 routed via the first core network node 130, and receiving 354 data packets from the first and the second anchor network node 115, 120 routed without passing the first core network node 130. The method further comprises storing 356 the data packets received 354 from the first anchor network node without passing the first core network node 130 in a first buffer, when such data packets are received before a first end marker is received from the first core network node, the first end marker indicating a last packet of the first anchor network node 115 routed via the first core network node 130, receiving 358 the first end marker, and sending 360 the data packets stored 356 in the first buffer to the second base station 160 in response to the received first end marker. The method further comprises storing 362 the data packets received 354 from the second anchor network node 120 without passing the first core network node 130 in a second buffer, when such data packets are received before a second end marker is received from the first core network node, the second end marker indicating a last packet of the second anchor network node 120 routed via the first core network node 130, receiving 364 the second end marker, and sending 366 the data packets stored 356 in the second buffer to the second base station 160 in response to the received second end marker.

By the second core network node storing the data packets received from the first core network node in different buffers depending on from which anchor network node they originated, the different buffers can be emptied at different times depending on when receiving the different end marker related to this anchor network node. In other words, when the first end marker is received, the data packets stored in the first buffer can be sent to the second base station and when the second end marker is received, the data packets stored in the second buffer can be sent to the second base station As a result, a quicker delivery of packets are received compared to if only one end marker is sent for packets from all anchor network nodes. That the session comprises data packets routed via a first and a second anchor network node from a data network signifies that some of the data packets of the session are routed via the first anchor network node and other of the data packets are routed via the second anchor network node.

Figure 1:
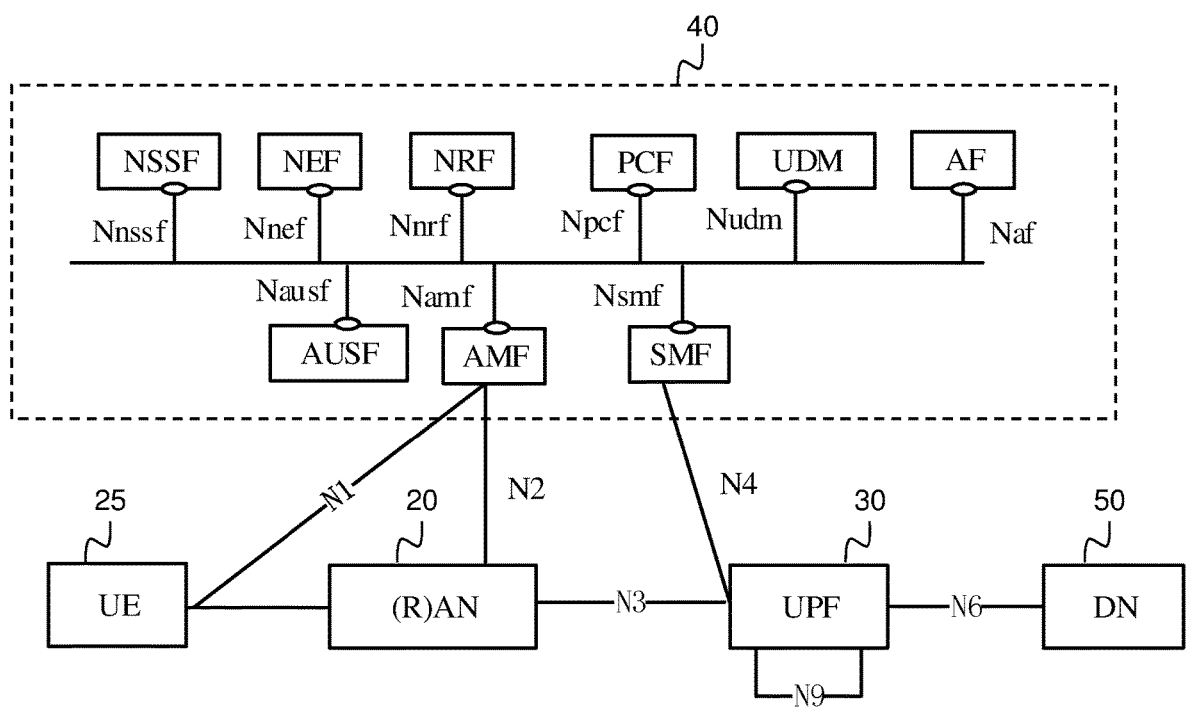
FIG. 1 is a block diagram of a 5G core network architecture in which the present invention may be used.
Figure 2:
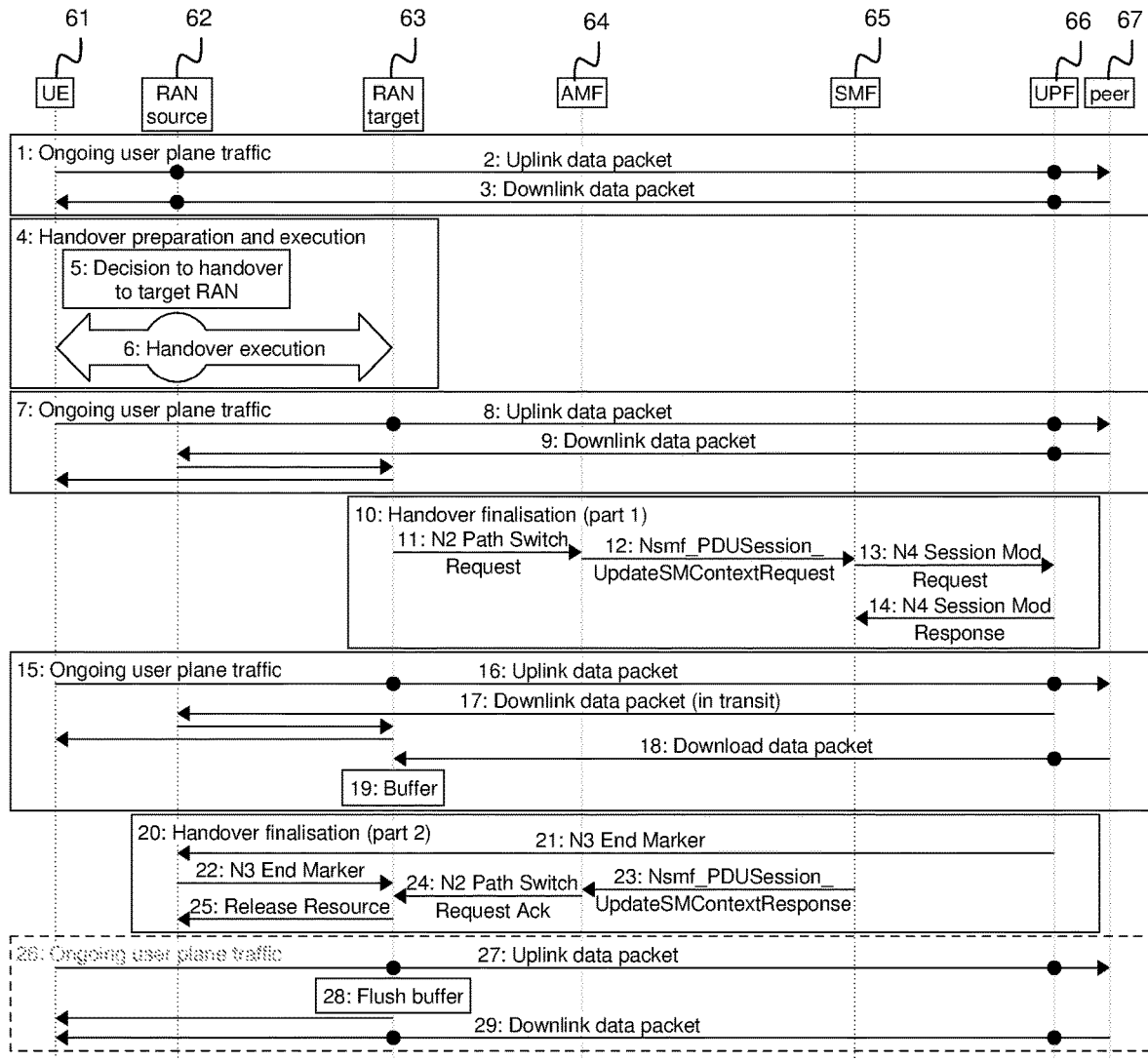
FIG. 2 is a signaling diagram of an inter NG-RAN handover, according to the prior art.
Figure 3:
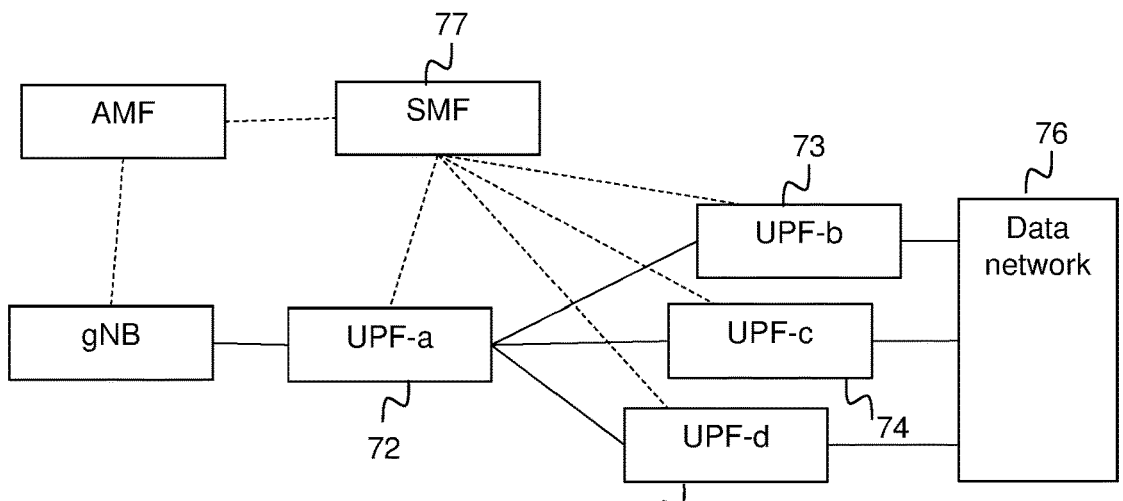
FIG. 3 is a block diagram of an improved core network architecture, according to prior art.

In the following, different embodiments are described. In a first embodiment a counting of end markers is performed in the RAN. The signaling diagram of FIG. 10 describes the first embodiment in detail. Observe that the names of the signals sent between the involved nodes are only examples of signal names, other names with similar purposes may also apply. The involved nodes are: a UE 461 involved in a session; a RAN source 462, which is the base station to which the UE is connected before handover, a RAN target 463, which is the base station to which the UE is connected after handover, an AMF 464, an SMF 465, which is a control plane network node, a UPF source 466, which is the first core network node of FIG. 5, a UPF target 467, which is the second core network node of FIG. 5, an LR 468, which is a control plane network node, a first IAP 469, which is the first anchor network node of FIG. 5, a second IAP 470, which is the second anchor network node of FIG. 5 and a peer 471. Observe that in contrast to the prior art of FIGS. 2 and 4, the handover is performed from the UPF source 466 and the RAN source 462 to the UPF target 467 and the RAN target 463. Therefore, in contrast to FIG. 4, there is a step 5 "Decision to relocate UPF" that is made by the SMF 465. In other words, the SMF decides if and to which UPF to relocate the session of the UE 461. This decision results, according to an embodiment, in the following chain of messages and actions: a relocation request (step 6) sent from the SMF 465 to the UPF source 466, a relocation (step 7) performed between the UPF target 467 and the UPF source 466 and a relocation complete (step 8) sent from the UPF target to the UPF source when the relocation is completed. However, other similar message steps may be sent to achieve the same purpose. An alternative way would be to send the relocation request (step 6) to the UPF target directly, and let the UPF target contact the UPF source. Relocation complete may also come from either source or target UPF. After the relocation, the downlink data packets are sent (step 11) from the first IAP 469 and from the second IAP 470 (not shown) to the UPF source 466 and further via the RAN source 462 to the RAN target 463 before being delivered to the UE 461. This is called the "old path" below. In this embodiment, the end marker is not sent from the UPF as in prior art. Instead, each IAP 469, 470 handling data packets of the session of the UE that did a handover sends an end marker (steps 22-25 and 26-29, respectively) via the old path when the last packet is sent from the IAP 469, 470. In other words, each end marker is sent all the way to the RAN target 463 via the UPF source 466 and the RAN source 462. Further, the RAN target 463 awaits to receive an end marker from each active IAP 469, 470. For the RAN target 463 to know that it has received an end marker from each active IAP, some administrative information may be added to the end markers sent to the RAN target. For example, when there are y active IAPs for this UE, then each IAP x includes information "I am number x out of y" into its end marker. Values x and y are sent from a control plane network node such as the LR to each IAP of the session (steps 14 and 15), when the LR is informed (step 13) by the SMF that the relocation is complete. Alternatively, the information on how many end markers that is to expect may be sent from a control plane network node such as the SMF 465 to the RAN target 463, e.g. via the AMF 464. This alternative is not shown in the sequence chart of FIG. 10.

So, each active IAP 469, 470 sends an end marker. This means that steps 22-25 and even 14 are performed for the first IAP, and steps 26-29 and 15 (in fact, even step 24) are performed for the second IAP. Downlink packets travel either over the old path: first and second IAP→UPF source→RAN source→RAN target, or over the new path: first and second IAP→UPF target→RAN target. The end markers always follow the old path. Downlink traffic following the new path is buffered in a buffer of the RAN target until end markers of all IAPs involved in the session are received over the old path. When end markers from all IAPs are received, the buffer is flushed (step 35), i.e. the data stored in the buffer is sent to the UE 461. Depending on how the relocation is implemented (step 7), there may be tromboning of data packets between source and target UPF during an intermediate period (see e.g. step 18).

Figure 11:
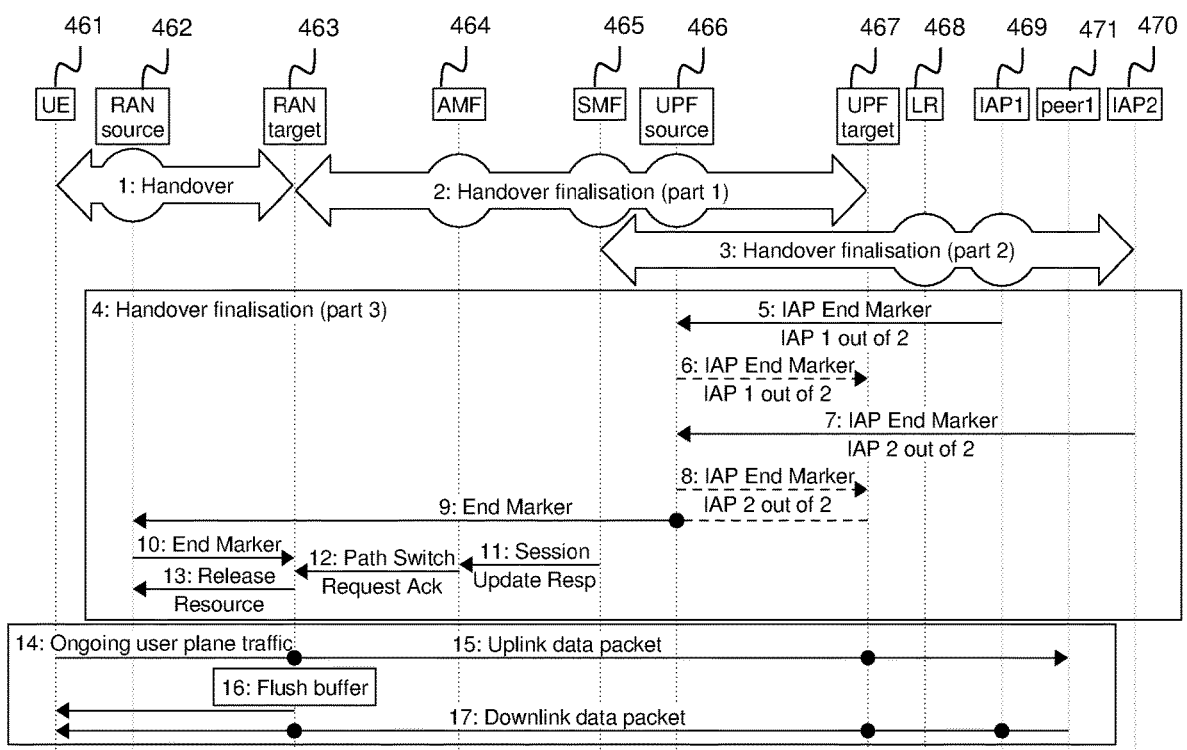

According to a second embodiment, which is shown in the simplified signaling diagram of FIG. 11, the end marker counting is performed in the UPF source 466 instead of in the RAN target 463. An advantage of the second embodiment compared to the first embodiment is that the RAN is not impacted. Further, with the first embodiment, the procedure in RAN is slightly different with or without UPF relocation. The embodiment avoids this. Here it is the UPF source 466 that receives (steps 5 and 7) the end markers from all the active IAPs for this UE and counts the end markers. Once IAP end markers have been received from all the active IAPS, the UPF source 466 sends a single triggering end marker (step 9) to the RAN target 463 via the RAN source 462. For RAN the procedure is the same as in the prior art of FIG. 4. In the sequence chart of FIG. 11 it is the UPF source 466 that collects the end markers from the IAPs and sends the triggering end marker to the RAN. It is also possible that the UPF target 467 does this instead, in the case when tromboning is used for sending the data packets, and the end markers.

In the first and second embodiments there is a single buffering and re-ordering performed in the RAN and controlled via end markers sent to the RAN. On the other hand, the fact that packets may arrive out-of-order is caused by two reasons: 1) Packets from the UPF source or UPF target travel both a first path via the RAN source 462 to the RAN target 463 and directly a second path to the RAN target 463. The first and the second path have different delays; 2) Packets from an IAP travel both a third path via the UPF source 466 to the UPF target 467 and a fourth path directly to the UPF target 467. The third and the fourth path have different delays. If packet order in the UPF is important, then buffering and re-ordering can be performed both in the RAN (to cover cause #1 above) and in the UPF (to cover cause #2 above). In fact, this can already be done in the sequence charts of embodiment 1 and 2 above. We can even go one step further and fully de-couple the two end marker purposes. This is a third embodiment that is shown in FIG. 12.

According to this third embodiment, a RAN end marker is sent immediately after, i.e. in response to that the UPF relocation has been performed (step 2). The RAN end marker can be sent (step 3) by the UPF source 466, or by the UPF target 467 via the UPF source (not shown), to the RAN source 462, and the RAN source sends (step 9) the RAN end marker further to the RAN target 463. During UPF relocation, the downlink data packets sent the new path, i.e. from UPF source 466 to UPF target 467 and further to the RAN target 463 (step 7), and that are received at the RAN target before the RAN end marker sent the old path, i.e. via the RAN source to the RAN target (step 3 and 9), is received at the RAN target 463, are stored in a buffer at the RAN target (step 8). The reception of the RAN end marker is a trigger to the RAN target 463 to flush its buffer (step 12). Further, during handover finalization part 2 (step 14) downlink data packets in transit are sent from the IAP via the UPF source to the UPF target (step 17), whereas other downlink data packets are sent directly to the UPF target (step 18). The downlink data packets sent directly to the UPF target and received there before the last packets in transit are received at UPF target are stored in the UPF target. When the last packet is sent the transit way by each IAP, each IAP sends an IAP end marker (step 21 and 23) the transit way via the UPF source. Here, the UPF target 467 may have a single re-ordering buffer for each IAP involved in the session for this UE 461. Whenever the end marker from an active IAP is received, that buffer can be flushed (step 30).

Figure 12:
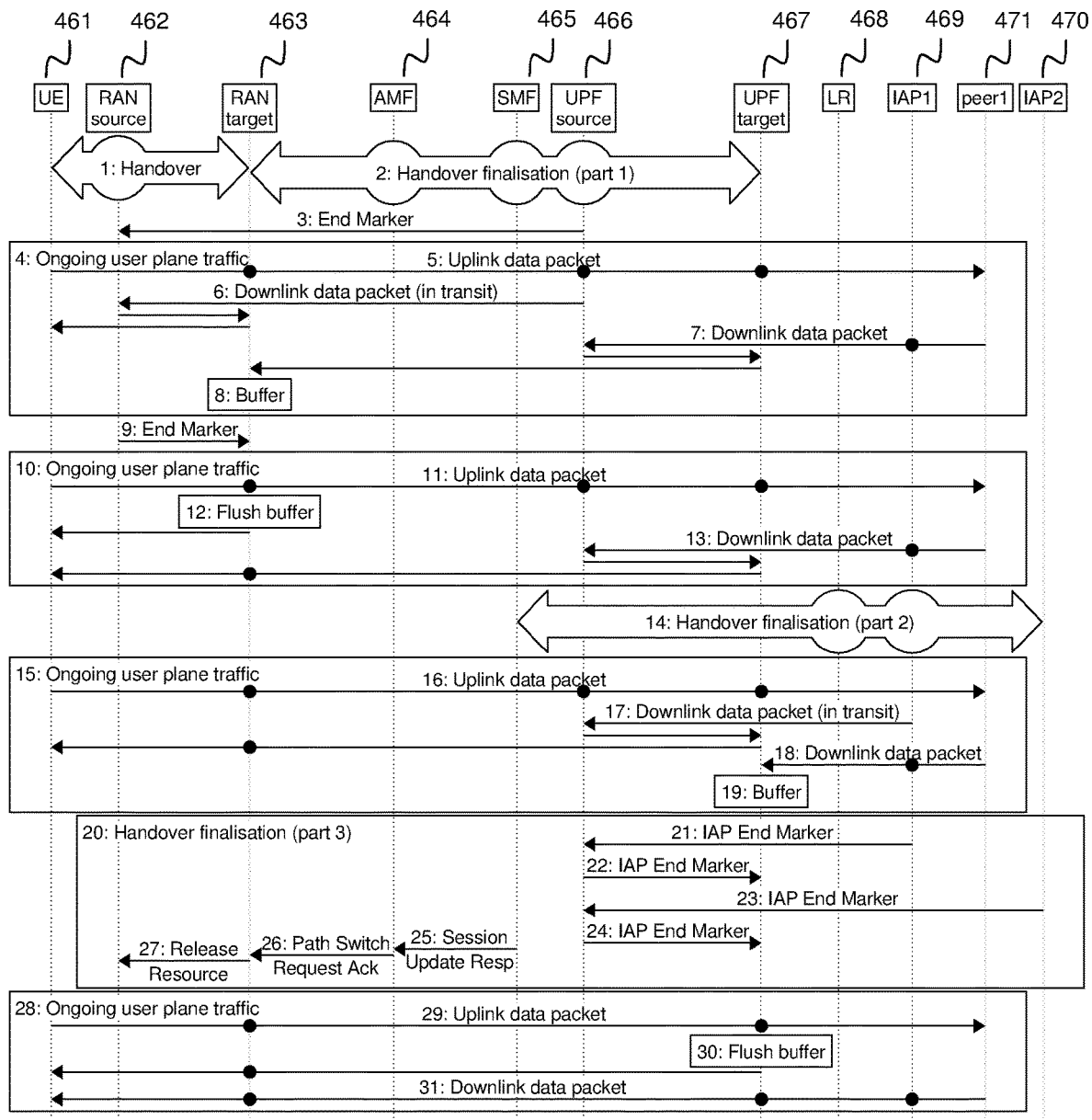

Note that in the chart of FIG. 12, the target UPF 467 sends all downlink packets to the target RAN 463. This is different from the first and second embodiment, where the target UPF could need to send downlink packets that travelled over the old path IAP→source UPF back to the source UPF, such that these packets can follow the old path source UPF→source RAN.

The procedures shown above for UPF relocation can be applied just as well when the UPF context is not relocated but a new target UPF is started. The end marker handling would be the same.

In the embodiments above, it is the IAPs that send the end markers. In the 5GC 3GPP specification, there is an option that the SMF generates the actual end marker packets, sends them to the UPF, where the UPF simply forwards the end marker packets. The reason for this is to keep the UPF simple. This approach can apply just as well to the above embodiments. In such approach, it would be the LR that generates the end marker packets and sends them to the respective IAP, and the respective IAP would forward its end marker packet to the UPF source. Alternatively, it would be the SMF that generates the end marker packets and sends them to the respective IAP via the LR.

The ideas and embodiments outlined above can just as well be applied to Evolved Packet Core (EPC). In that case, the IAP is an entity broken out from the Packet Data Network (PDN) Gateway (PGW). The remaining part of the PGW is no longer a data network anchor, and can therefore be relocated just as the UPF above. LR would logically become a part of the MME.

Figure 13:
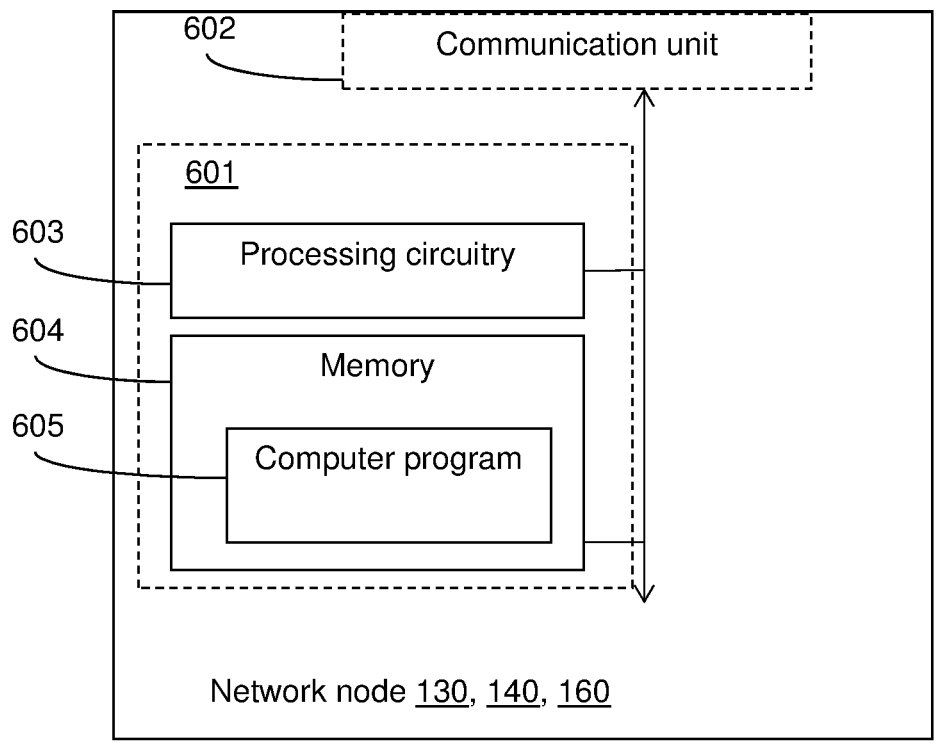
FIG. 13 is a block diagram illustrating a network node in more detail, according to further possible embodiments.

FIG. 13, in conjunction with FIG. 5, describes a network node 130, 140, 160 operable in a wireless communication system 100 configured for handling a session comprising data packets to be transmitted to a wireless device 170. The wireless communication network 100 comprises a first core network node 130, a second core network node 140, a first base station 150 and a second base station 160. The session comprises data packets routed via a plurality of anchor network nodes 115, 120 from a data network 110. Further, in connection with the wireless device 170 handing over from the first base station 150 and the first core network node 130 to the second base station 160 and the second core network node 140, and the network node 130, 140, 160 comprising a processing circuitry 603 and a memory 604, said memory containing instructions executable by said processing circuitry, the network node 130, 140, 160 is operative for receiving information of the number of the plurality of anchor network nodes 115, 120 via which data packets of the session are routed, and receiving data packets from the plurality of anchor network nodes 115, 120. The network node is further operative for receiving an end marker of each of the plurality of anchor network nodes 115, 120, each end marker indicating a last data packet of one of the plurality of anchor network nodes routed via the first core network node 130 and, when the number of received end markers equals the number of the plurality of anchor network nodes, triggering to send to the wireless device 170 any data packets related to the session not routed via the first base station stored in a buffer of the second base station.

According to an embodiment, the network node 130, 140, 160 is operative for receiving the information of the number of the plurality of anchor network nodes from a control plane network node.

According to another embodiment, the network node 130, 140, 160 is operative for receiving the information of the number of the plurality of anchor network nodes together with each end marker.

According to another embodiment, the network node is the second base station 160. Further, the network node is operative for storing in the buffer, any data packets of the received data packets that are not routed via the first base station and that are received from the anchor network nodes before the sending was triggered. Also, the network node is operative for the triggering to send by sending to the wireless device 170 the data packets that are stored in the buffer.

According to another embodiment, the network node is the first core network node 130. Further, the network node is operative for sending the received data packets to the second base station via the first base station. Also, the network node is operative for the triggering to send by sending a triggering end marker to the second base station via the first base station, the triggering end marker triggering the second base station to send any packets related to the session it has stored in its buffer.

According to another embodiment, the network node is the second core network node 140. Further, the network node is operative for sending the received data packets to the second base station. Also, the network node is operative for the triggering to send by sending a triggering end marker to the second base station via the first base station, the triggering end marker triggering the second base station to send any packets related to the session it has stored in its buffer.

According to other embodiments, the network node 130, 140, 160 may further comprise a communication unit 602, which may be considered to comprise conventional means for communication with other nodes in the network. In case the network node is the second base station, the second base station also comprises conventional means for wireless communication with wireless devices, such as one or more transceivers. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the network node 130, 140, 160 to perform the steps described in any of the described embodiments of the network node 130, 140, 160 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the network node 130, 140, 160 has access via the communication unit 602. The computer program 605 may then be downloaded from the server into the memory 604.

Figure 14:
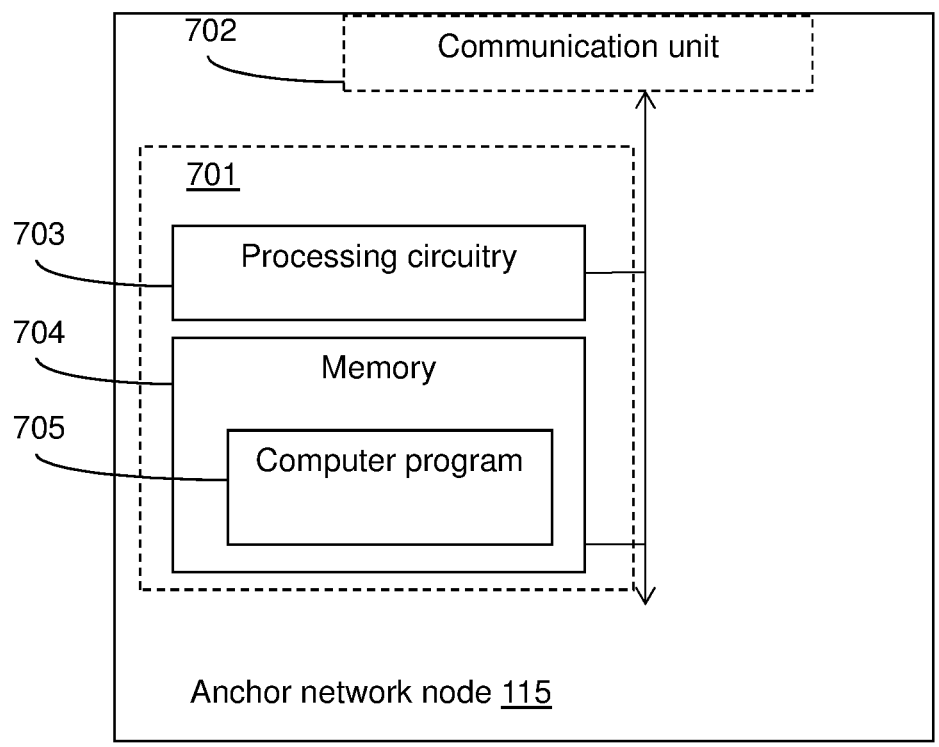
FIG. 14 is a block diagram illustrating an anchor network node in more detail, according to further possible embodiments.

FIG. 14, in conjunction with FIG. 5, describes an anchor network node 115 operable in a wireless communication system 100, configured for handling a session comprising data packets to be transmitted to a wireless device 170. The wireless communication network 100 comprises a first core network node 130, a second core network node 140, a first base station 150 and a second base station 160, and at least one additional anchor network node 120. The session comprises data packets routed via the anchor network node 115 and the at least one additional anchor network node from a data network 110 towards the wireless device 170. Further, in connection with the wireless device 170 handing over from the first base station 150 and the first core network node 130 to the second base station 160 and the second core network node 140, the anchor network node 115 comprising a processing circuitry 703 and a memory 704, said memory containing instructions executable by said processing circuitry, the anchor network node 115 is operative for sending, to the first core network node 130, data packets of the session received from the data network. The anchor network node is further operative for receiving, from a control network node, information of the number of anchor network nodes involved in the session and sending, to the first core network node 130, the information of the number of anchor network nodes involved in the session. The anchor network node is further operative for sending, to the first core network node 130, an end marker indicating a last packet to be routed via the first core network node 130, and sending to the second core network node 140, after the end marker has been sent, data packets of the session received from the data network.

According to other embodiments, the anchor network node 115 may further comprise a communication unit 702, which may be considered to comprise conventional means for communication with other nodes in the network and with the data network. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the anchor network node 115 to perform the steps described in any of the described embodiments of the anchor network node 115 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the anchor network node 115 has access via the communication unit 702. The computer program 705 may then be downloaded from the server into the memory 704.

Figure 15:
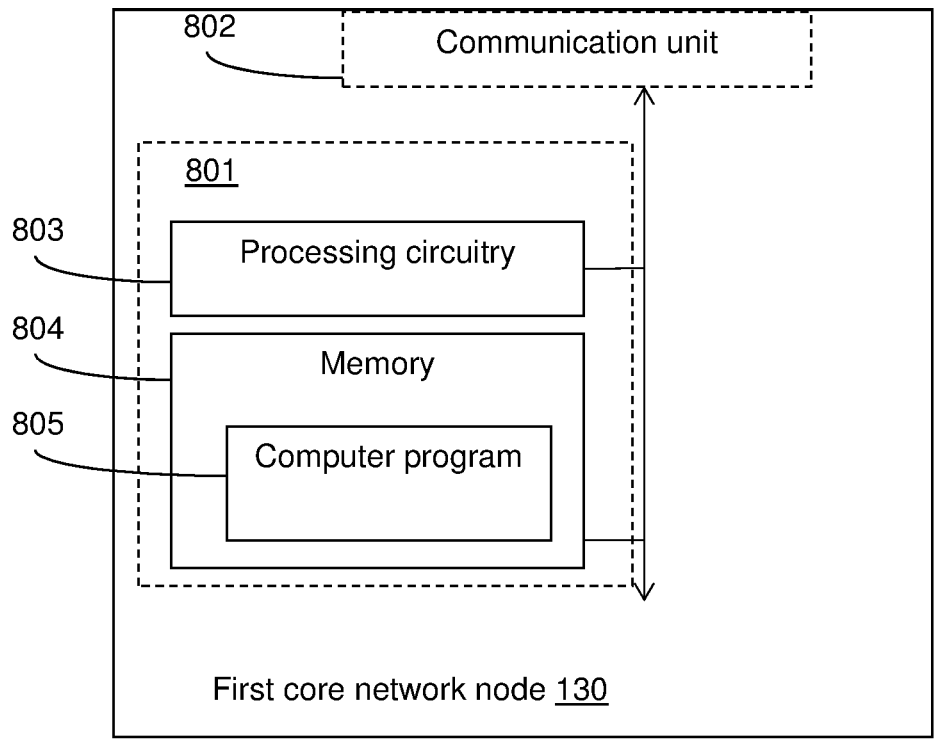
FIG. 15 is a block diagram illustrating a first core network node in more detail, according to further possible embodiments.

FIG. 15, in conjunction with FIG. 5, describes a first core network node 130 operable in a wireless communication system 100, configured for handling a session comprising data packets to be transmitted to a wireless device 170. The wireless communication network 100 further comprises a second core network node 140, a first base station 150 and a second base station 160. The session comprises data packets routed via a first and a second anchor network node 115, 120 from a data network 110. Further, in connection with the wireless device 170 handing over from the first base station 150 and the first core network node 130 to the second base station 160 and the second core network node 140, the first core network node 130 comprising a processing circuitry 803 and a memory 804, said memory containing instructions executable by said processing circuitry, the first core network node 130 is operative for receiving data packets from the first and the second anchor network node 115, 120 and sending the data packets received from the first and the second anchor network nodes 115, 120 to the first base station. The first core network node 130 is further operative for sending a RAN end marker to the second base station 160 via the first base station 150 in response to information that a relocation of the wireless device 170 from the first core network node 130 to the second core network node 140 has been requested, and sending, to the second core network node 140, the data packets received from the first and the second anchor network nodes 115, 120 after the sending of the RAN end marker. The first core network node 130 is further operative for receiving a first end marker from the first anchor network node 115, the first end marker indicating a last packet of the first anchor network node 115 routed via the first core network node 130, and sending the first end marker to the second core network node 140. The first core network node 130 is further operative for receiving a second end marker from the second anchor network node 120, the second end marker indicating a last packet of the second anchor network node 120 routed via the first core network node 130, and sending the second end marker to the second core network node 140.

According to embodiments, the first core network node 130 may further comprise a communication unit 802, which may be considered to comprise conventional means for communication with other nodes in the network, such as the second core network node, the first base station and the anchor network nodes. The instructions executable by said processing circuitry 803 may be arranged as a computer program 805 stored e.g. in said memory 804. The processing circuitry 803 and the memory 804 may be arranged in a sub-arrangement 801. The sub-arrangement 801 may be a micro-processor and adequate software and storage therefore, a Programmable Logic Device, PLD, or other electronic component(s)/processing circuit(s) configured to perform the methods mentioned above. The processing circuitry 803 may comprise one or more programmable processor, application-specific integrated circuits, field programmable gate arrays or combinations of these adapted to execute instructions.

The computer program 805 may be arranged such that when its instructions are run in the processing circuitry, they cause the first core network node 130 to perform the steps described in any of the described embodiments of the first core network node 130 and its method. The computer program 805 may be carried by a computer program product connectable to the processing circuitry 803. The computer program product may be the memory 804, or at least arranged in the memory. The memory 804 may be realized as for example a RAM (Random-access memory), ROM (Read-Only Memory) or an EEPROM (Electrical Erasable Programmable ROM). Further, the computer program 805 may be carried by a separate computer-readable medium, such as a CD, DVD or flash memory, from which the program could be downloaded into the memory 804. Alternatively, the computer program may be stored on a server or any other entity to which the first core network node 130 has access via the communication unit 802. The computer program 805 may then be downloaded from the server into the memory 804.

Figure 16:
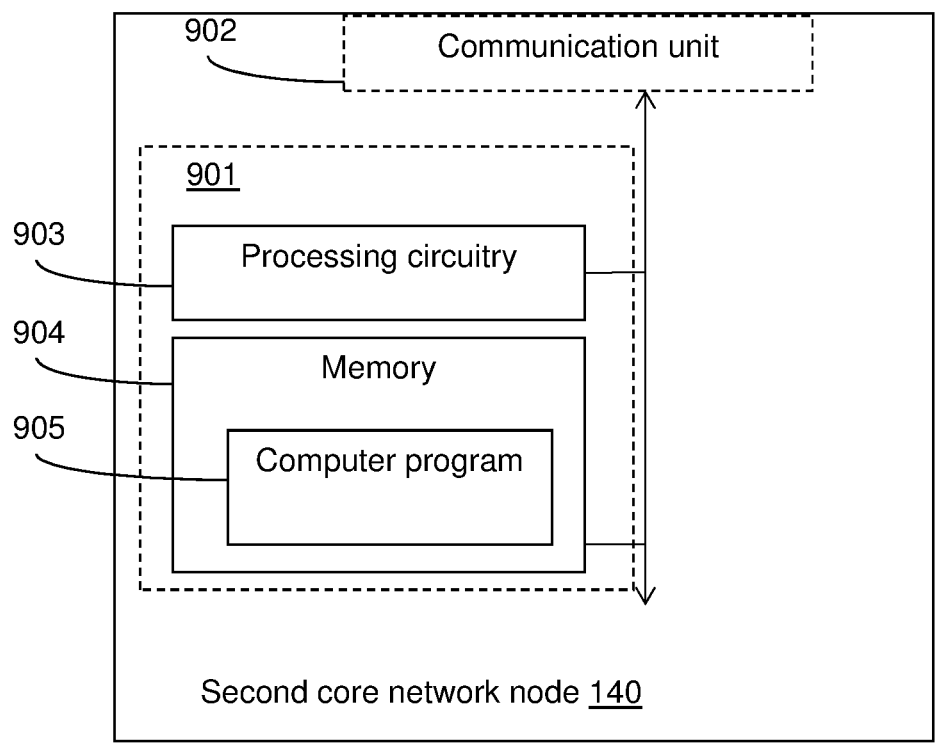
FIG. 16 is a block diagram illustrating a second core network node in more detail, according to further possible embodiments.

FIG. 16, in conjunction with FIG. 5, describes a second core network node 140 operable in a wireless communication network 100, configured for handling a session comprising data packets to be transmitted to a wireless device 170. The wireless communication network 100 further comprises a first core network node 130, a first base station 150 and a second base station 160. The session comprises data packets routed via a first and a second anchor network node 115, 120 from a data network 110. Further, in connection with the wireless device 170 handing over from the first base station 150 and the first core network node 130 to the second base station 160 and the second core network node 140, the second core network node 140 comprising a processing circuitry 903 and a memory 904, said memory containing instructions executable by said processing circuitry, whereby the second core network node 140 is operative for receiving data packets from the first and the second anchor network node 115, 120 routed via the first core network node 130, and receiving data packets from the first and the second anchor network node 115, 120 routed without passing the first core network node 130. The second core network node is further operative for storing the data packets received from the first anchor network node without passing the first core network node 130 in a first buffer, when such data packets are received before a first end marker is received from the first core network node, the first end marker indicating a last packet of the first anchor network node 115 routed via the first core network node 130, receiving the first end marker, and sending the data packets stored in the first buffer to the second base station 160 in response to the received first end marker. The second core network node is further operative for storing the data packets received from the second anchor network node 120 without passing the first core network node 130 in a second buffer, when such data packets are received before a second end marker is received from the first core network node, the second end marker indicating a last packet of the second anchor network node 120 routed via the first core network node 130, receiving the second end marker, and sending the data packets stored in the second buffer to the second base station 160 in response to the received second end marker.

According to embodiments, the second core network node 140 may further comprise a communication unit 902, which may be considered to comprise conventional means for communication with other nodes in the network, such as the first core network node, the second base station and the anchor network nodes. The instructions executable by said processing circuitry 903 may be arranged as a computer program 905 stored e.g. in said memory 904. The processing circuitry 903 and the memory 904 may be arranged in a sub-arrangement 901. The sub-arrangement 901 may be a micro-processor and adequate software and storage therefore, a Programmable Logic Device, PLD, or other electronic component(s)/processing circuit(s) configured to perform the methods mentioned above. The processing circuitry 903 may comprise one or more programmable processor, application-specific integrated circuits, field programmable gate arrays or combinations of these adapted to execute instructions.

The computer program 905 may be arranged such that when its instructions are run in the processing circuitry, they cause the second core network node 140 to perform the steps described in any of the described embodiments of the second core network node 140 and its method. The computer program 905 may be carried by a computer program product connectable to the processing circuitry 903. The computer program product may be the memory 904, or at least arranged in the memory. The memory 904 may be realized as for example a RAM (Random-access memory), ROM (Read-Only Memory) or an EEPROM (Electrical Erasable Programmable ROM). Further, the computer program 905 may be carried by a separate computer-readable medium, such as a CD, DVD or flash memory, from which the program could be downloaded into the memory 904. Alternatively, the computer program may be stored on a server or any other entity to which the second core network node 140 has access via the communication unit 902. The computer program 905 may then be downloaded from the server into the memory 904.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." Features marked with dashed lines in the figures describe optional embodiments. All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A network node operable in a wireless 5G communication system configured for handling a session comprising data packets to be transmitted to a wireless device, the wireless 5G communication network comprising a first core network node, a second core network node, a first base station and a second base station, wherein the session comprises data packets routed via a plurality of anchor network nodes from a data network, and, in connection with the wireless device handing over from the first base station and the first core network node to the second base station and the second core network node, the network node comprising a processing circuitry and a memory, said memory containing instructions executable by said processing circuitry whereby the network node is configured to:
   receive information of the number of the plurality of anchor network nodes via which data packets of the session are routed;
   receive data packets from the plurality of anchor network nodes;
   receive an end marker of each of the plurality of anchor network nodes, each end marker indicating a last data packet of one of the plurality of anchor network nodes routed via the first core network node; and
   when the number of received end markers equals the number of the plurality of anchor network nodes, trigger to send to the wireless device any data packets related to the session not routed via the first base station stored in a buffer of the second base station.

2. The network node according to claim 1, wherein the information of the number of the plurality of anchor network nodes is received together with each end marker.

3. The network node according to claim 1, wherein the network node is the second base station, said memory containing instructions executable by said processing circuitry whereby the network node is configured to:
   store, in the buffer, any data packets of the received data packets that are not routed via the first base station and that are received from the anchor network nodes before the sending is triggered; and
   send to the wireless device the data packets that are stored in the buffer.

4. The network node according to claim 1, wherein the network node is the first core network node, said memory containing instructions executable by said processing circuitry whereby the network node is configured to:
   send the received data packets to the second base station via the first base station; and
   send a triggering end marker to the second base station via the first base station, the triggering end marker triggering the second base station to send any packets related to the session it has stored in its buffer.

5. The network node according to claim 1, wherein the network node is the second core network node, said memory containing instructions executable by said processing circuitry whereby the network node is configured to:
   send the received data packets to the second base station; and
   send a triggering end marker to the second base station via the first base station, the triggering end marker triggering the second base station to send any packets related to the session it has stored in its buffer.

6. An anchor network node operable in a wireless 5G communication system, configured for handling a session comprising data packets to be transmitted to a wireless 5G device, the wireless communication network comprising a first core network node, a second core network node, a first base station and a second base station, and at least one additional anchor network node, wherein the session comprises data packets routed via the anchor network node and the at least one additional anchor network node from a data network towards the wireless device, and, in connection with the wireless device handing over from the first base station and the first core network node to the second base station and the second core network node, the anchor network node comprising a processing circuitry and a memory, said memory containing instructions executable by said processing circuitry whereby the anchor network node is configured to:

send, to the first core network node, data packets of the session received from the data network;

receive, from a control network node, information of the number of anchor network nodes involved in the session;

send, to the first core network node, the information of the number of anchor network nodes involved in the session;

send, to the first core network node, an end marker indicating a last packet to be routed via the first core network node; and send to the second core network node, after the end marker has been sent, data packets of the session received from the data network.

7. The anchor network node according to claim 6, wherein the information of the number of the plurality of anchor network nodes is sent together with the end marker.

8. A first core network node operable in a wireless 5G communication system, configured for handling a session comprising data packets to be transmitted to a wireless device, the wireless 5G communication network further comprising a second core network node, a first base station and a second base station, wherein the session comprises data packets routed via a first and a second anchor network node from a data network, and, in connection with the wireless device handing over from the first base station and the first core network node to the second base station and the second core network node, the first core network node comprising a processing circuitry and a memory, said memory containing instructions executable by said processing circuitry whereby the first core network node is configured to:

receive data packets from the first and the second anchor network node;

send the data packets received from the first and the second anchor network nodes to the first base station;

send a RAN end marker to the second base station via the first base station in response to information that a relocation of the wireless device from the first core network node to the second core network node has been requested, send, to the second core network node, the data packets received from the first and the second anchor network nodes after the sending of the RAN end marker, receive a first end marker from the first anchor network node, the first end marker indicating a last packet of the first anchor network node routed via the first core network node;

send the first end marker to the second core network node;

receive a second end marker from the second anchor network node, the second end marker indicating a last packet of the second anchor network node routed via the first core network node, and send the second end marker to the second core network node.

9. A second core network node operable in a wireless 5G communication network, configured for handling a session comprising data packets to be transmitted to a wireless device, the wireless 5G communication network further comprising a first core network node, a first base station and a second base station, wherein the session comprises data packets routed via a first and a second anchor network node from a data network, and, in connection with the wireless device handing over from the first base station and the first core network node to the second base station and the second core network node, the second core network node comprising a processing circuitry and a memory, said memory containing instructions executable by said processing circuitry whereby the second core network node is configured to:

receive data packets from the first and the second anchor network node routed via the first core network node;

receive data packets from the first and the second anchor network node routed without passing the first core network node;

store the data packets received from the first anchor network node without passing the first core network node in a first buffer, when such data packets are received before a first end marker is received from the first core network node, the first end marker indicating a last packet of the first anchor network node routed via the first core network node;

receive the first end marker;

send the data packets stored in the first buffer to the second base station in response to the received first end marker;

store the data packets received from the second anchor network node without passing the first core network node in a second buffer, when such data packets are received before a second end marker is received from the first core network node, the second end marker indicating a last packet of the second anchor network node routed via the first core network node;

receive the second end marker; and send the data packets stored in the second buffer to the second base station in response to the received second end marker.

\* \* \* \* \*